(12) United States Patent
McGarry

(10) Patent No.: US 9,903,427 B1
(45) Date of Patent: Feb. 27, 2018

(54) MOTORCYCLE REAR BRAKE DISC GUARD

(71) Applicant: T.M. Designworks, LLC, Phoenix, OR (US)

(72) Inventor: Timothy McGarry, Phoenix, OR (US)

(73) Assignee: T.M. Designworks, LLC, Phoenix, OR (US)

( * ) Notice: Subject to any disclaimer, the term of this patent is extended or adjusted under 35 U.S.C. 154(b) by 0 days.

(21) Appl. No.: 15/231,769

(22) Filed: Aug. 8, 2016

(51) Int. Cl.
F16D 65/00 (2006.01)

(52) U.S. Cl.
CPC .................. *F16D 65/005* (2013.01)

(58) Field of Classification Search
CPC .... F16D 65/005; F16D 65/00; F16D 65/0025; F16D 2055/0037; F16D 65/847; F16D 65/22; F16D 55/00
USPC ............... 188/218 A, 218 XL, 264 AA, 71.6
See application file for complete search history.

(56) References Cited

U.S. PATENT DOCUMENTS

| | | | | | |
|---|---|---|---|---|---|
| 4,005,768 | A | * | 2/1977 | Bubnash | B60T 1/065 |
| | | | | | 188/218 A |
| 4,155,601 | A | * | 5/1979 | Ito | B60B 7/00 |
| | | | | | 188/218 A |
| 4,207,971 | A | * | 6/1980 | Ishikawa | F16D 55/22 |
| | | | | | 188/218 A |
| 4,253,552 | A | * | 3/1981 | Shibatani | B60T 1/065 |
| | | | | | 188/2 R |
| 4,257,498 | A | * | 3/1981 | Nogami | F16D 55/22 |
| | | | | | 188/218 A |
| 4,295,549 | A | * | 10/1981 | Shibatani | B60T 1/065 |
| | | | | | 188/2 R |
| 4,317,508 | A | * | 3/1982 | Katagiri | F16D 55/22 |
| | | | | | 188/218 A |
| 4,326,610 | A | * | 4/1982 | Mouza | F16D 53/00 |
| | | | | | 188/218 A |
| 4,473,139 | A | * | 9/1984 | Oka | F16D 55/22 |
| | | | | | 188/218 A |
| 5,735,370 | A | * | 4/1998 | Nitta | F16D 55/22 |
| | | | | | 188/218 A |
| 6,286,638 | B1 | * | 9/2001 | Rowan | B60T 8/171 |
| | | | | | 188/181 A |
| 6,626,272 | B2 | * | 9/2003 | Frouin | F16D 55/00 |
| | | | | | 188/18 A |

(Continued)

FOREIGN PATENT DOCUMENTS

JP    59205032 A  * 11/1984  ............. F16D 55/22

OTHER PUBLICATIONS

"Shark Fin Rear Rotor Guard for KTM (3-14) & 9-13 Husaberg," TM Designworks Website, Available Online at http://tmdesignworks.com/index.php?main_page=product_info&cPath=246_274&products_id=567, Mar. 28, 2010, 2 pages.

*Primary Examiner* — Thomas J Williams
*Assistant Examiner* — Mariano Sy
(74) *Attorney, Agent, or Firm* — Alleman Hall Creasman & Tuttle LLP

(57) ABSTRACT

A disc guard assembly for use in shielding a disc of a rear disc brake system on a motorcycle is provided. The disc guard assembly may include a disc guard, which may be plastic, and a carrier adapter, which may be metal. The carrier adapter may be removably attached to a rear brake carrier mount of the rear disc brake system of the motorcycle via one or more fasteners, and the disc guard may be removably attached to the carrier adapter via one or more fasteners.

18 Claims, 14 Drawing Sheets

(56) References Cited

U.S. PATENT DOCUMENTS

| | | | |
|---|---|---|---|
| 7,341,130 B2* | 3/2008 | Samuelsson | F16D 55/00 188/218 A |
| 7,866,450 B2* | 1/2011 | Nakamura | F16D 55/00 188/218 A |
| 8,365,883 B2* | 2/2013 | Matsubayashi | B62J 15/00 188/206 R |
| 8,960,383 B2* | 2/2015 | Pahle | F16D 65/00 188/218 A |
| 9,239,087 B2* | 1/2016 | Frantz | F16D 55/00 |
| 9,422,993 B2* | 8/2016 | Watarai | F16D 65/12 |
| 2005/0126868 A1* | 6/2005 | Lee | F16D 55/00 188/218 A |
| 2009/0266655 A1* | 10/2009 | Mikura | B62J 23/00 188/218 A |

* cited by examiner

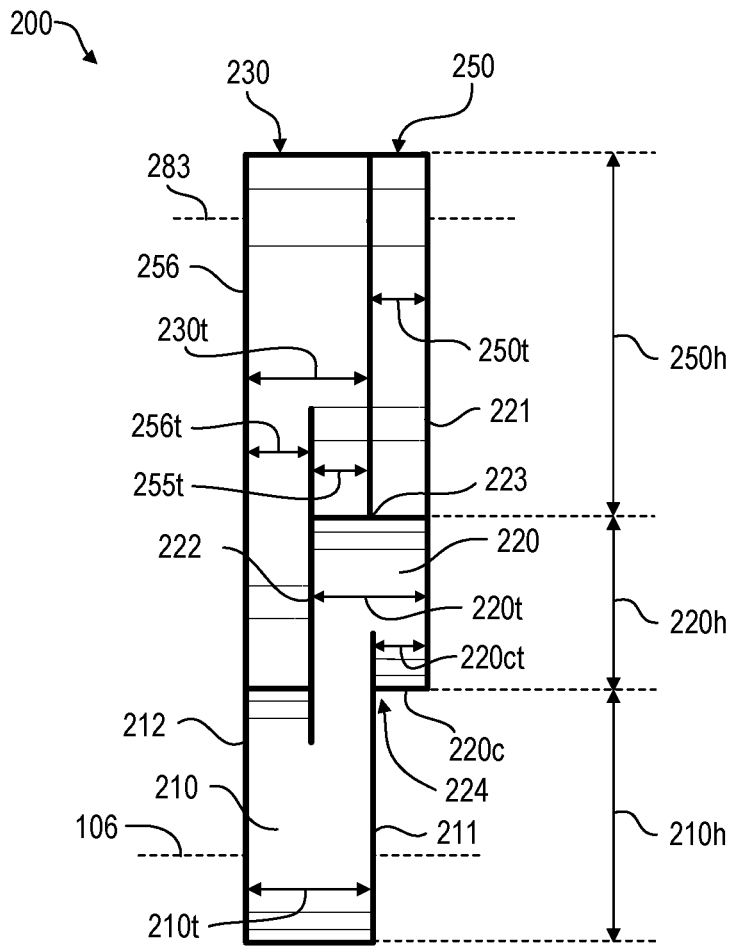
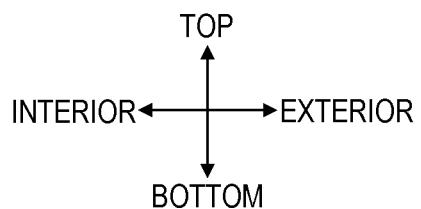
FIG. 6C

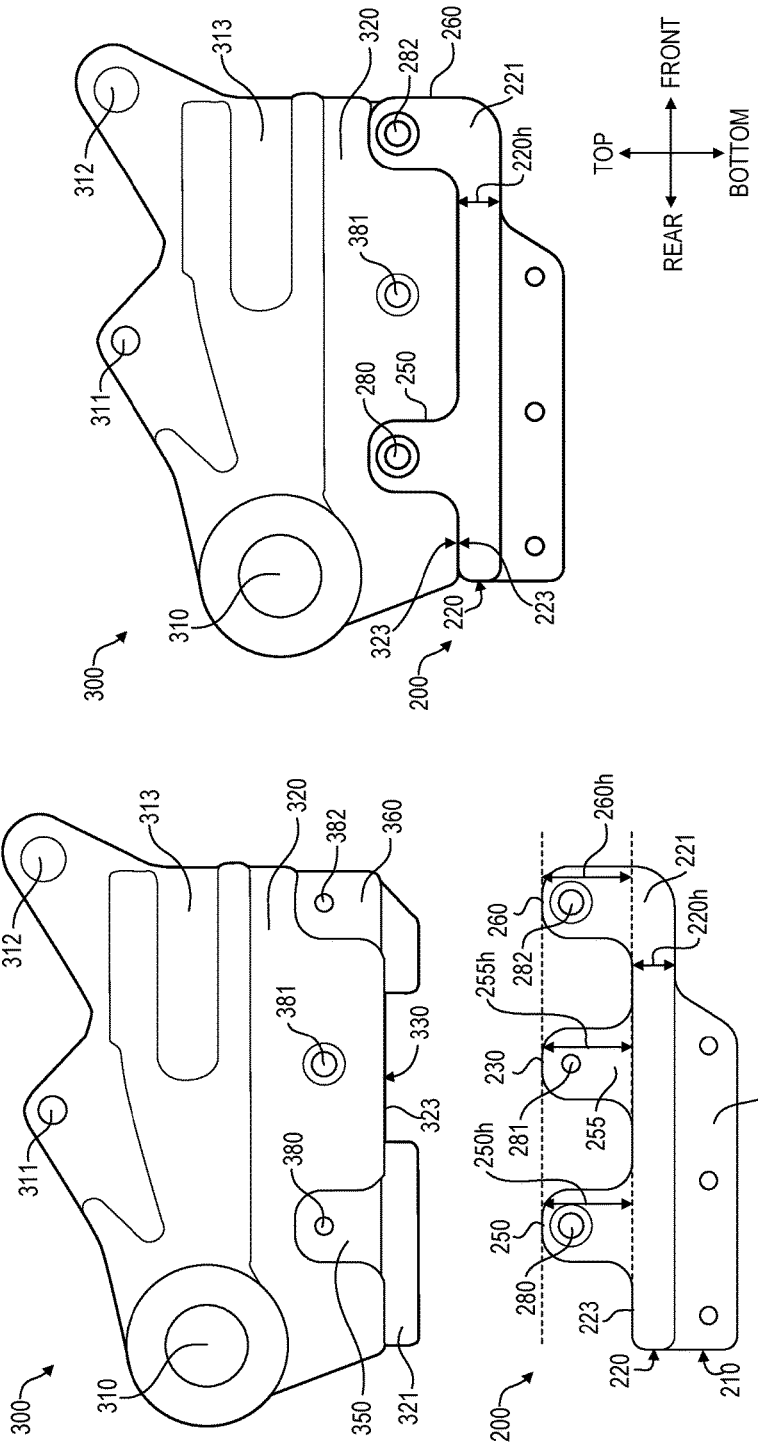

MOTORCYCLE REAR BRAKE DISC GUARD

BACKGROUND

Motorcycles often utilize a caliper-type disc brake system to slow or stop the rotation of a wheel, since this type of brake system tends to be lighter weight and provide superior stopping performance in various weather conditions as compared to other types of braking systems. In a typical disc brake system, a disc configured for co-rotation with a wheel rotates on a plane parallel to the plane of the wheel, with the disc passing between two opposing brake calipers with brake pads configured to simultaneously come into contact with opposing sides of the disc when activated to slow or stop the rotation of the disc, and in turn, the wheel. The disc functions optimally when its surfaces are maintained to be as planar as possible, which encourages good mating contact with the brake pads. Thus, protecting the disc from debris or impacts that may cause damage and bend the surface of the rotor is important for performance. Protecting the disc is more problematic for a motorcycle than for an automobile, due to exposure of the disc, as explained below.

Automobile disc brake systems are more advantageously positioned on a common axis with and alongside an axle on the inner side of a wheel between the automobile frame and the wheel. In this position, the disc itself is substantially protected from external damage from rocks and other damaging debris due to the surrounding wheel assembly components such as the wheel, the automobile undercarriage, wheel suspension components, and often a fender or other covering of the wheel and wheel assembly as an extension of the automobile body.

In contrast, a motorcycle disc brake system is open to the exterior and thus is more vulnerable to damage from approaching objects, and from contact with the ground. This exposed configuration is problematic for road-use motorcycles that generally are used on paved surfaces, due to debris that may be contacted when riding on such surfaces. Further, such an exposed configuration is even more problematic for off-road motorcycles which are often operated off road in a more debris laden environment, under more extreme riding conditions in which such debris is flung up with greater force and density, and in which occasionally the motorcycle including its braking system discs may come in contact with the ground.

SUMMARY

To address these issues, a disc guard assembly for shielding a disc of a rear disc brake system on a motorcycle is provided. In one aspect, the disc has a center axis, an interior side surface, an exterior side surface and a disc perimeter surface, and the rear disc brake system is configured with a rear brake carrier assembly attached to a structural frame of the motorcycle. The rear brake carrier assembly includes a carrier body having a carrier mount hole. The disc guard assembly includes a disc guard having a side wall configured to cover at least a portion of the exterior side surface of the disc as viewed from an exterior side in a first direction parallel to the center axis of the rotor, the side wall having a top end portion with a disc guard mount hole formed therein, and a bottom portion, the disc guard further including a lateral wall extending toward an interior side in the first direction from the bottom portion and covering the disc perimeter surface as viewed from a bottom of the disc guard. The disc guard assembly further includes a carrier adapter having a body including a first adapter portion having a guard-adapter mount hole and a second adapter portion having an adapter-brake mount hole, the first adapter portion being positioned below the second adapter portion on the body. The carrier adapter is removably attached to the disc guard by a disc guard fastener extending through the guard-adapter mount hole and the disc guard mount hole, and the carrier adapter is attached to the rear brake carrier mount by an adapter-brake mount fastener extending through the adapter-brake mount hole and the carrier mount hole.

In this aspect, the disc guard may be plastic, and the carrier adapter may be metal.

In this aspect, the bottom wall may have a curved shape that substantially corresponds to a shape of the disc perimeter surface, as viewed from the first direction.

In this aspect, the bottom wall may extend from a disc guard anterior point at a front end of the top end portion, through a nadir point of the bottom wall, to a disc guard posterior point.

In this aspect, the second adapter portion may be configured with at least two tabs each having a corresponding tab mount hole.

In this aspect, a first of the at least two tabs may be configured to engage a corresponding first tab receiving slot on a first side of the disc brake carrier mount, and a second of the at least two tabs may be configured to engage a corresponding second tab receiving slot on a second side of the disc brake carrier mount opposite the first side with the disc brake carrier mount therebetween.

In this aspect, the side wall may be configured with at least one opening.

According to another aspect, the guard assembly may include a disc guard, and a carrier adapter including a first adapter portion configured to removably attach to the disc guard via a first fastener, and a second adapter portion configured to removably attach to the disc brake carrier mount by way of a second fastener.

In this aspect, the disc guard may be plastic, and the carrier adapter may be metal.

In this aspect, the second adapter portion may include a first tab having a first tab mount hole, and a second tab having a second tab mount hole, and the first tab and the second tab may be configured to engage corresponding first and second tab receiving slots with tab receiving mount holes on a first side of the disc brake carrier mount, further the second adapter portion may include a third tab configured to engage a corresponding third tab receiving slot with third tab receiving mount hole on a second side of the disc brake carrier mount opposite the first side. and the first tab and the second tab may be configured to engage corresponding first and second tab receiving slots with tab receiving mount holes on a first side of the disc brake carrier mount, and the third tab may be configured to engage a corresponding third tab receiving slot with third tab receiving mount hole on a second side of the disc brake carrier mount opposite the first side, and the carrier adapter, when removably attached to the disc brake carrier mount, may orient the disc guard so that a first guard portion of the disc guard is in parallel proximity to a face surface of the disc, and the second guard portion of the disc guard is in parallel proximity to a disc perimeter edge thickness of the disc.

In this aspect, the first adapter portion may be configured with at least one guard-adapter mount hole, and the second adapter portion may be configured as a cantilever extending away from the first adapter portion to overhang the at least one guard-adapter mount hole.

In this aspect, the disc guard may be configured with a first guard portion and a second guard portion, the first guard portion having a plurality of disc guard mount holes proximate a proximal region of the first guard portion, and a disc guard distal edge at a distal end of the first guard portion, the disc guard distal edge having a substantially curved shape extending from a disc guard anterior point to a disc guard posterior point along the disc guard distal edge, and the second guard portion may be located along the disc guard distal edge substantially perpendicular to and extending away from an interior surface of the first guard portion along the disc guard distal edge.

In this aspect, the disc guard posterior point may be located substantially proximate an intersection of the curvilinear shape of the disc guard distal edge and a second line originating from a disc center axis point of the disc at an angle θ° to the posterior of a first line that is substantially plumb originating from the disc center axis point.

In this aspect, the disc guard may be configured with at least one disc guard opening.

According to another aspect, a carrier adapter for use with a disc guard provided to shield a disc of a rear disc brake system on a motorcycle is provided, including a carrier adapter body configured to removably attach via a first side to the rear brake carrier mount, the carrier adapter being body configured to removably attach via a second side opposite the first side to a disc guard.

In this aspect, the carrier adapter body may be metal.

In this aspect, the carrier adapter body may include a plurality of tabs extending upward from the first side, the plurality of tabs being configured to contact respective interior and exterior sides of the rear brake carrier mount, to thereby sandwich and secure the rear brake carrier mount.

In this aspect, at least one of the tabs on the first side may include a first hole through which a first fastener is configured to secure the at least one of the tabs to the rear brake carrier mount, and the second side may include a second hole through which a second fastener is configured to secure the second side to the disc guard.

In this aspect, the first side of the carrier adapter body may be laterally offset from the second side of the carrier body. This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIG. 6C shows a rear plan view of the carrier adapter of FIG. 2.

FIG. 7A shows an exterior plan view of the carrier adapter of FIG. 2 and a rear brake carrier mount of a rear disc brake system of a motorcycle.

FIG. 7B shows an exterior plan view of the carrier adapter and the rear brake carrier mount of FIG. 7A, in a removably attached configuration.

DETAILED DESCRIPTION

Figure 1:
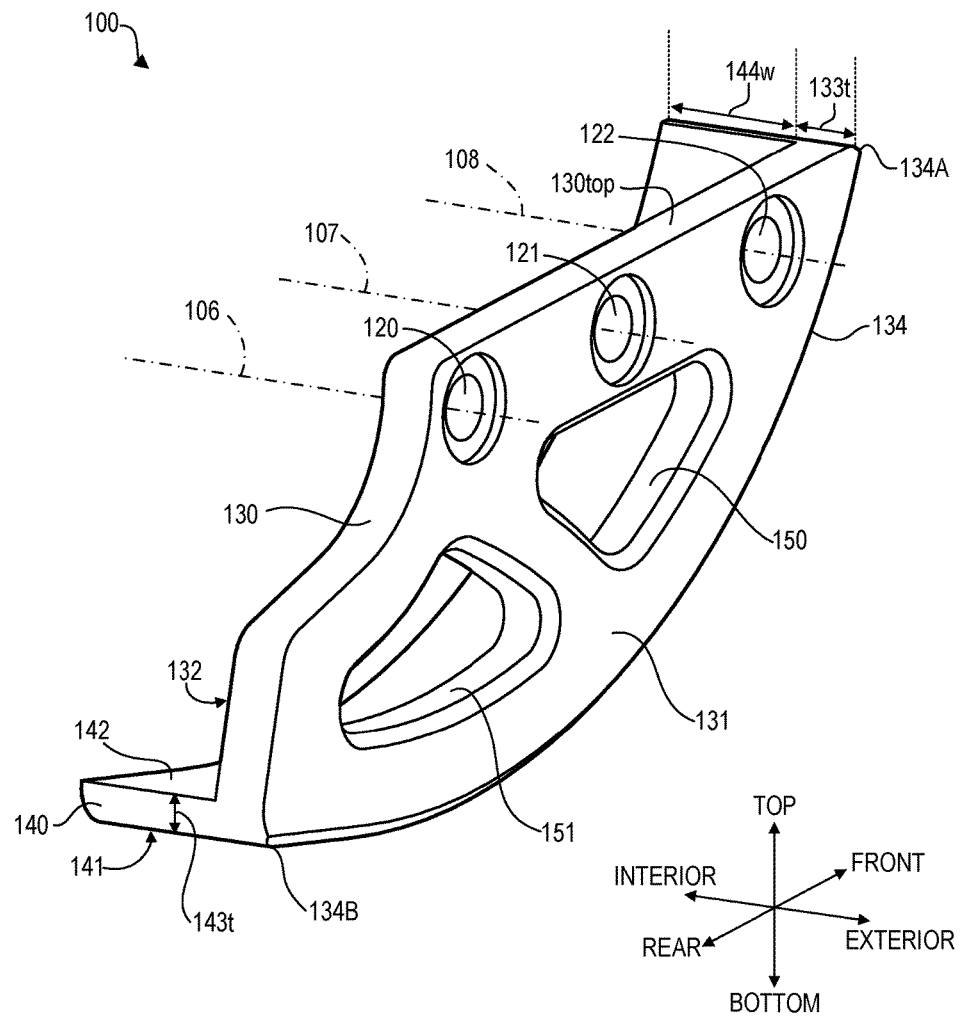
FIG. 1 shows a top rear exterior perspective view of a disc guard according to an embodiment of the present disclosure.

FIG. 1 illustrates a top rear exterior perspective view of a disc guard 100 oriented with a corresponding top-bottom axis, front-rear axis, and exterior-interior axis according to an example embodiment. These directions, used throughout this specification, correspond to the position of the disc guard when mounted to a motorcycle. The disc guard 100 typically is of uni-body or one-piece construction, and may be made of a rigid plastic such ultra-high molecular weight nylon. The disc guard 100 is configured with a first guard portion 130 which may be configured as a side wall configured to cover at least a portion of the exterior side surface of the disc as viewed from an exterior side in a first direction parallel to the center axis of the rotor (see FIG. 12). The first guard portion 130 has a first guard exterior surface 131 opposite a first guard interior surface 132, a first guard thickness 133t, a first guard top surface 130top, and a disc guard bottom edge 134 at a bottom end portion thereof, which can also be referred to as a disc guard distal edge, and which has a substantially curvilinear shape extending in rearwardly and downwardly from a disc guard front point 134A at a front end of the disc guard 100, to a disc guard rear point 134B at a rearward end of the disc guard 100. The first guard portion 130 in one example embodiment is configured with a plurality of disc guard mount holes 120, 121, 122 in a top end portion thereof, where each disc guard mount hole is correspondingly centered on a plurality of guard-adapter axes 106, 107, 108. The first guard portion 130 further includes at least one and optionally a plurality of disc guard openings 150, 151 to allow air to pass freely through the disc guard 100 to cool a disc 15 (see FIG. 12) of the disc brake system that is positioned in a parallel plane and proximate to the first guard interior surface 132. The disc guard openings 150, 151 are further sized to prevent large solid objects from passing through and damaging the disc 15, yet allowing liquids, viscous material mixtures, dust, dirt, and small rocks to exit through the disc guard 100 without becoming built up or lodged therein and interfering with the operation of the disc 15. Between the openings 150, 151 a bridging portion is provided. In the depicted embodiment, the openings are substantially triangular and the bridging portion extends downwardly in a diagonal direction toward a front of the disc guard. Other configurations for the openings and bridging portion are also contemplated.

Figure 5A:
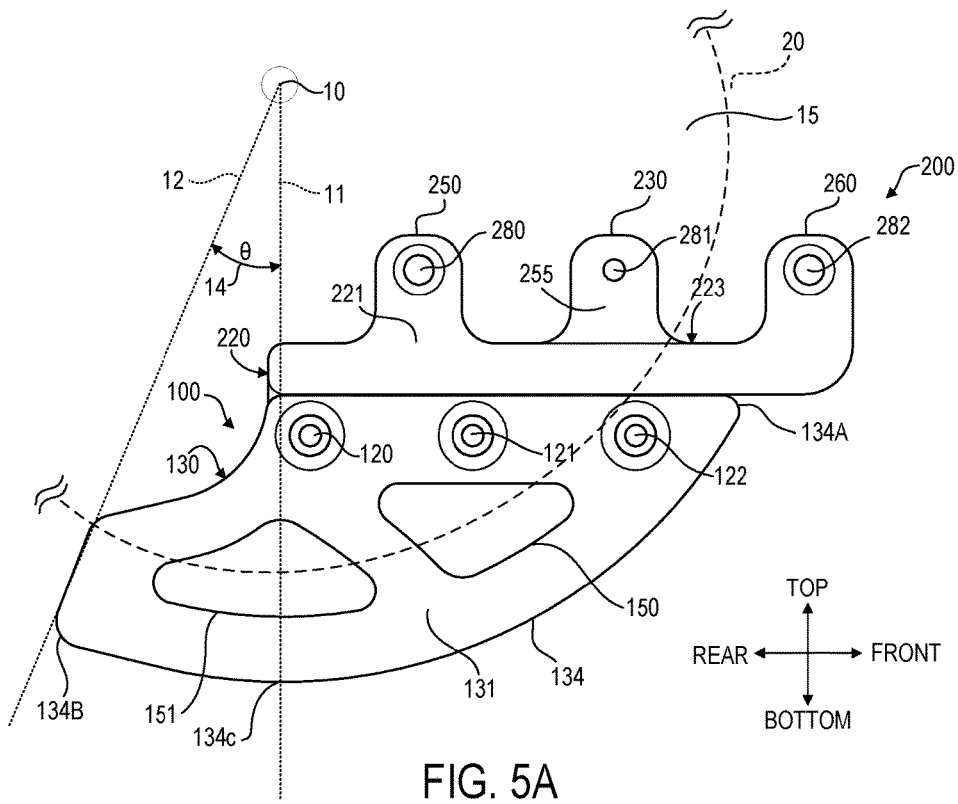
FIG. 5A shows an exterior plan view of the assembled disc guard assembly of FIG. 4.
Figure 5B:
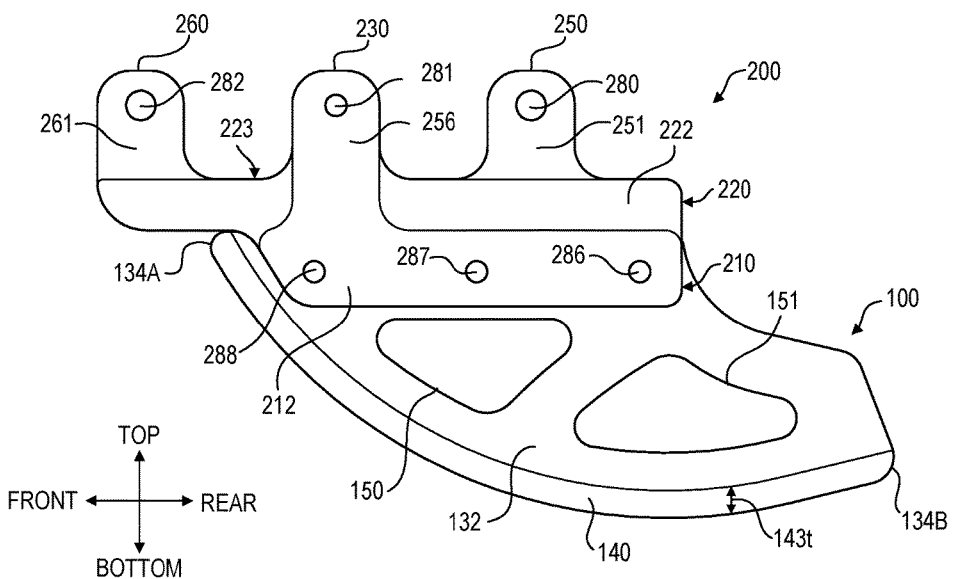
FIG. 5B shows an interior plan view of the assembled disc guard assembly of FIG. 4.
Figure 5C:
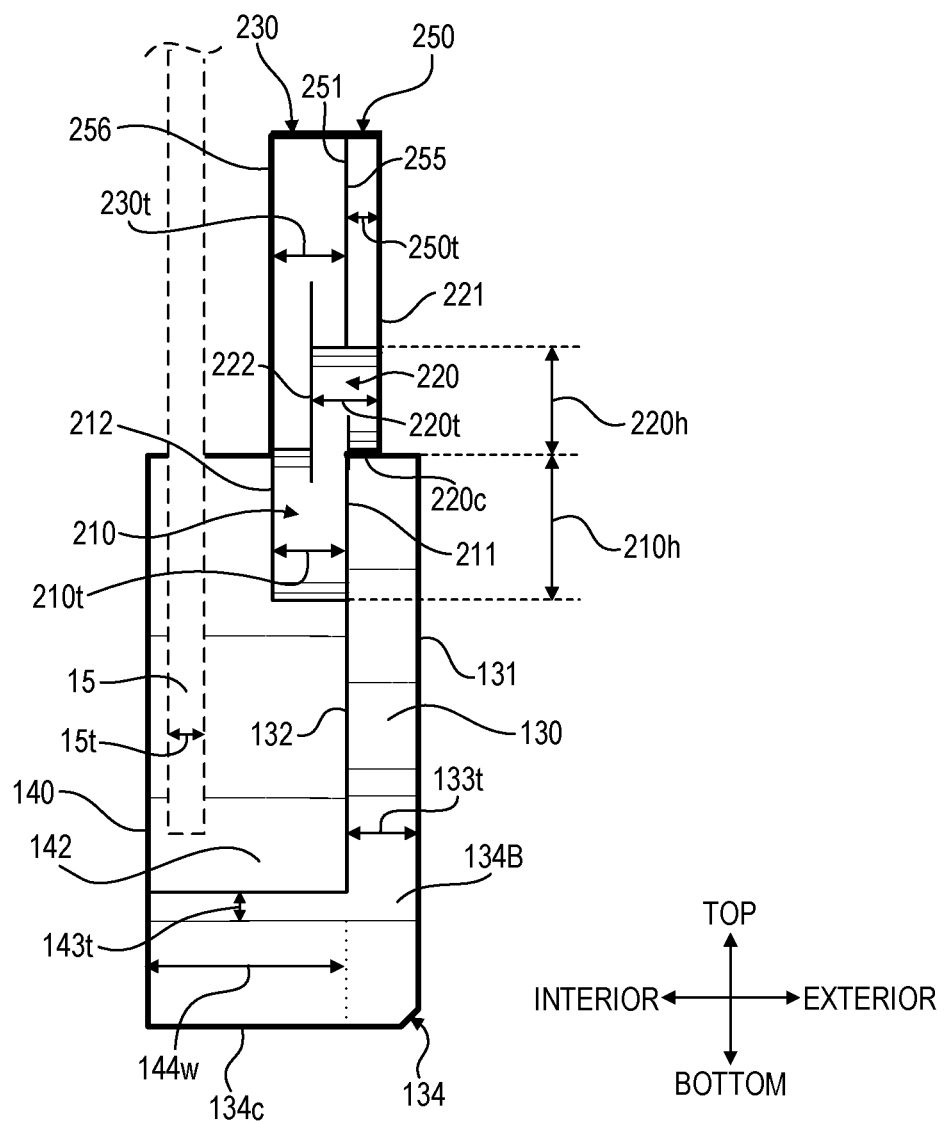
FIG. 5C shows a rear plan view of the assembled disc guard assembly of FIG. 4.
Figure 11:
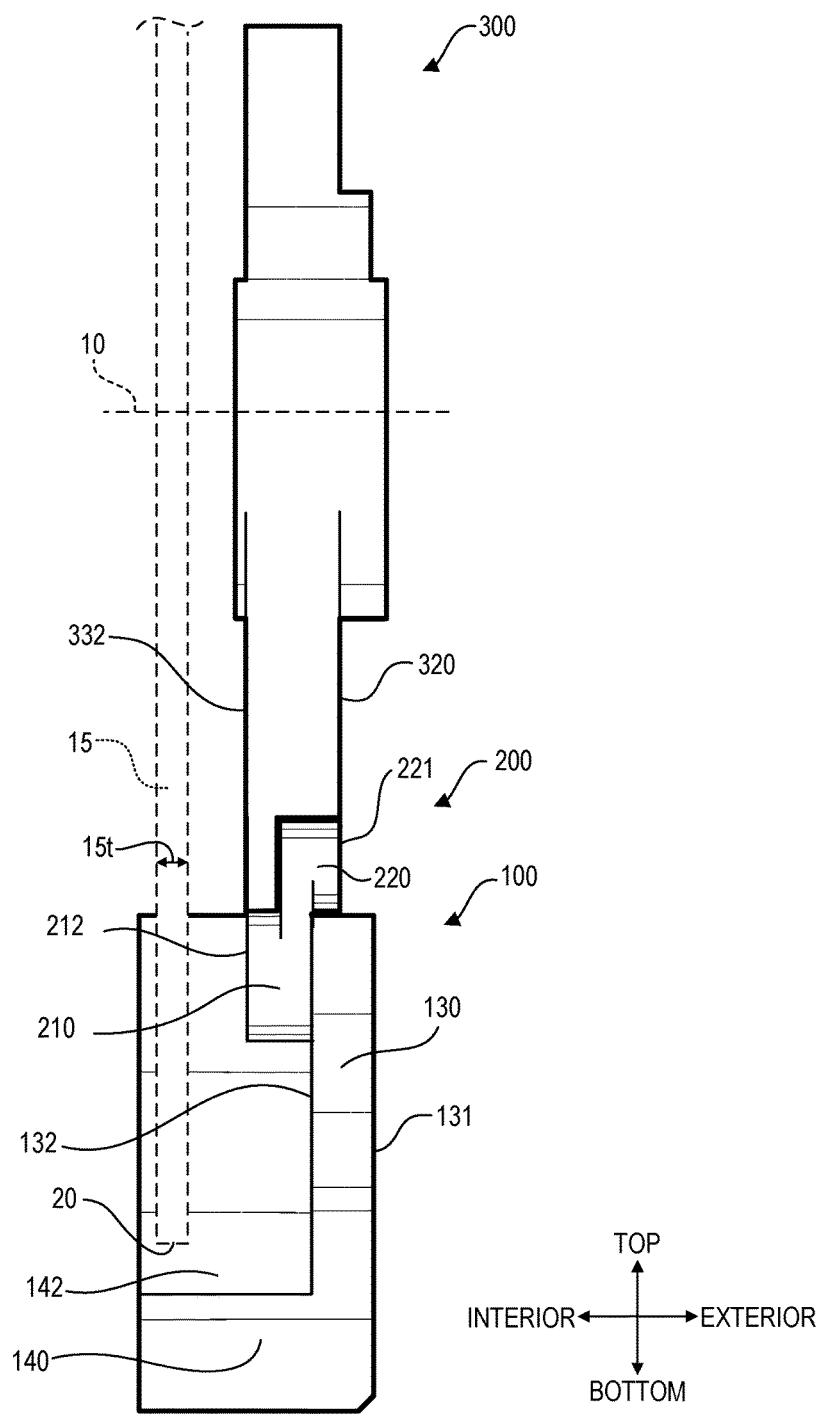
FIG. 11 shows a rear plan view of the rear brake carrier mount of FIG. 7A and the disc guard assembly of FIG. 3, in a removably attached configuration.

The disc guard 100 further includes a second guard portion 140 which may be formed in the shape of a lateral wall extending toward an interior side in the first direction from the bottom portion and covering the disc perimeter surface as viewed from a bottom of the disc guard (see FIGS. 5C and 11 for illustration of coverage of disc from bottom). The second guard portion 140 has a second guard exterior surface 141 opposite a second guard interior surface 142, a second guard thickness 143$t$, and a second guard width 144$w$. The second guard portion 140 is located at the distal or bottom end of the first guard portion 130 and extends in an interior direction away from the first guard interior surface 132 along the second guard width 144$w$. In the depicted embodiment the second guard portion 140 is formed is substantially perpendicular to the first guard portion 130.

Figure 2:
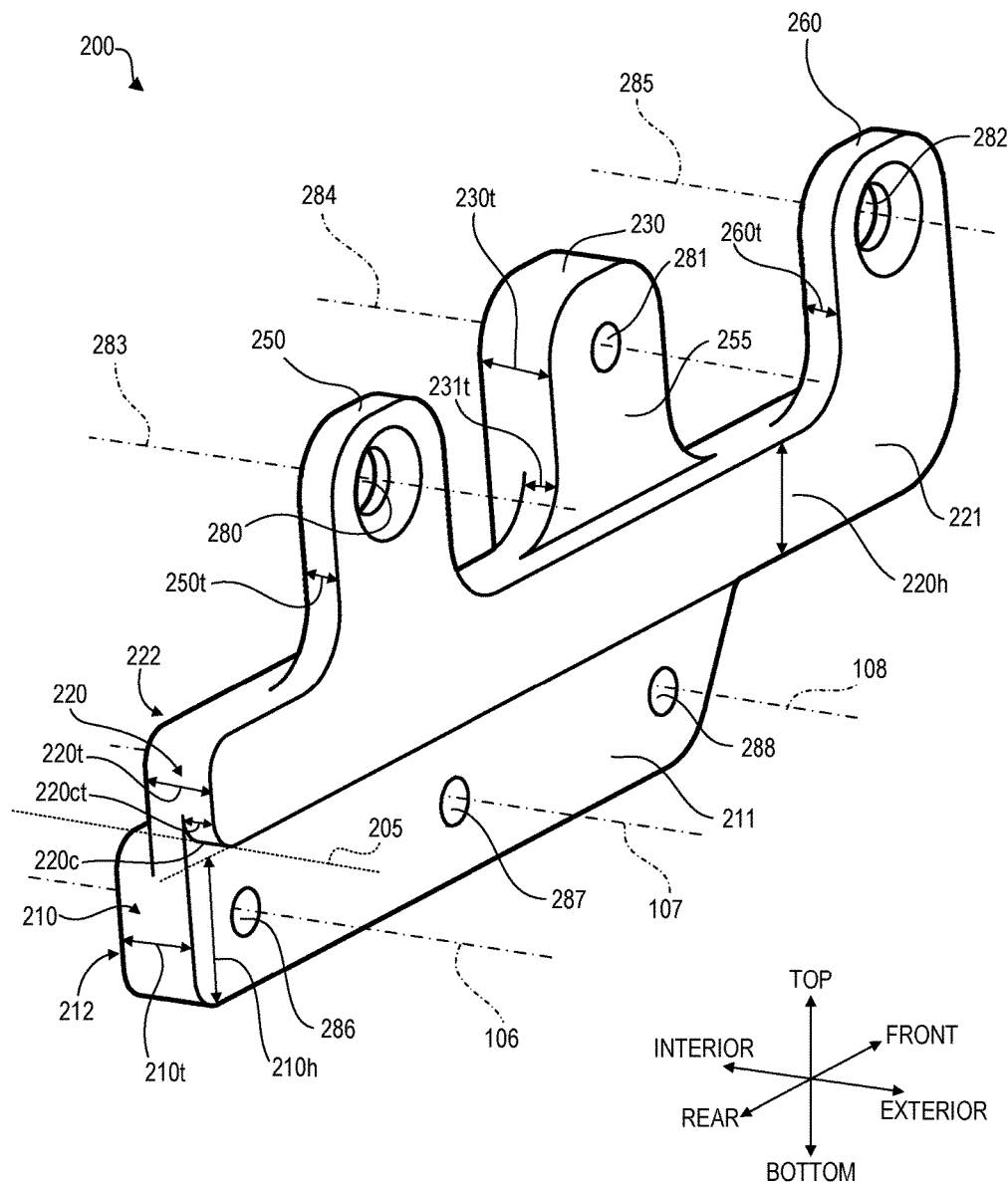
FIG. 2 shows a top rear exterior perspective view of a carrier adapter according to an embodiment of the present disclosure.

FIG. 2 illustrates a top rear exterior perspective view of a carrier adapter 200 oriented with a corresponding top-bottom axis, front-rear axis, and exterior-interior axis according to an example embodiment. The carrier adapter 200 may be a uni-body or one piece construction of metal such as an aluminum alloy. Alternatively, plastic or another material may be used for the carrier adapter. The carrier adapter 200 includes a body including a first adapter portion 210 having one or more guard-adapter mount holes 286, 287, 288 and a second adapter portion 220 having an adapter-brake mount hole. The carrier adapter 200 is removably attached to the disc guard 100 by a disc guard fastener 127 (see FIG. 4) extending through the guard-adapter mount hole and the disc guard mount hole. Returning to FIG. 2, the carrier adapter 200 is attached to the rear brake carrier mount by an adapter-brake mount fastener 227 (see FIG. 9) extending through the adapter-brake mount hole and the carrier mount hole. Although only one fastener 227 is illustrated in FIG. 9 it will be appreciated that a fastener 227 is provided for each disc guard mount hole.

Returning to FIG. 2, the first adapter portion 210 is positioned below the second adapter portion 220 on the body, below an adapter transition level 205. The first adapter portion 210 has a first adapter exterior surface 211 opposite a first adapter interior surface 212, a first adapter portion height 210$h$, a first adapter portion width 210$t$, and a plurality of guard-adapter mount holes 286, 287, 288 where each guard-adapter mount hole is correspondingly centered on a plurality of guard-adapter axes 106, 107, 108.

The second adapter portion 220 is positioned above the adapter transition level 205, the second adapter portion 220 having a second adapter exterior surface 221 opposite a second adapter interior surface 222, a second adapter height 220$h$, and a second adapter thickness 220$t$. The second adapter portion 220 oriented with a cantilever 220$c$ extending in an exterior direction away from the first adapter exterior surface 211 a distance of a cantilever thickness 220$ct$.

Figure 9:
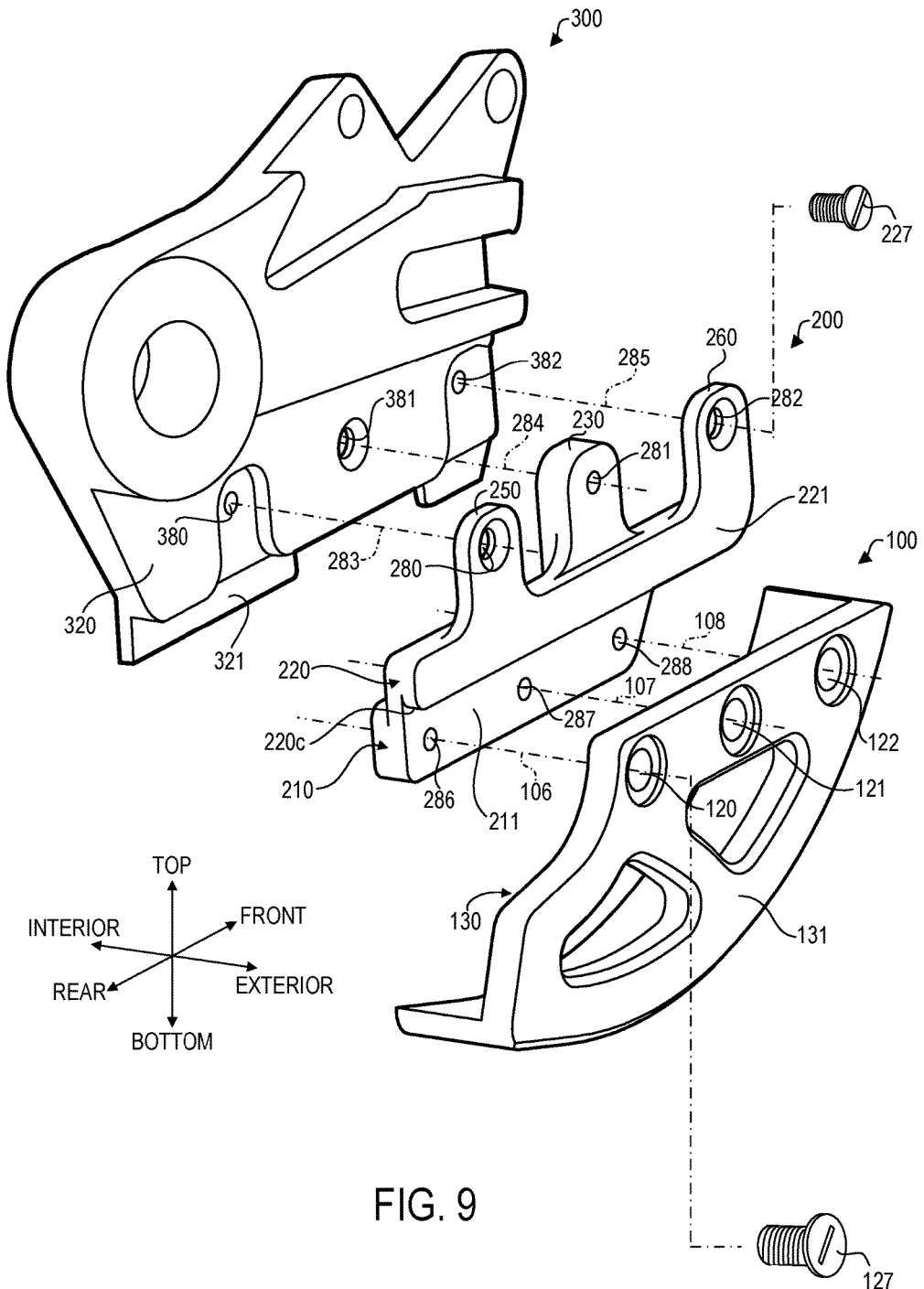
FIG. 9 shows an exploded top rear exterior perspective view of the rear brake carrier mount of FIG. 7A and the disc guard assembly of FIG. 3.

The second adapter portion 220 is further configured with a plurality of tabs extending upward from a first side thereof, the plurality of tabs being configured to contact respective interior and exterior sides of the rear brake carrier mount 300, to thereby sandwich and secure the rear brake carrier mount, as shown in FIG. 9. Returning to FIG. 2, for example, a first tab 250 is positioned along the front-rear vertical plane of the second adapter portion 220 and substantially proximate the rear of the second adapter portion 220, extending in the top direction uninterruptedly away from the second adapter top surface 223 in the same vertical plane and as an extension of the second adapter exterior surface 221, and having a first tab thickness 250$t$ extending from the second adapter exterior surface 221 in the interior direction to partly the depth of the second adapter thickness 220$t$. The first tab 250 has a first tab mount hole 280 on a first adapter-brake mount axis 283.

In the illustrated embodiment, the second adapter portion 220 of the carrier adapter 200 is further configured with a second tab 260 positioned along the front-rear vertical plane of the second adapter portion 220 and substantially proximate the front of the second adapter portion 220, extending in the top direction uninterruptedly away from the second adapter top surface 223 in the same vertical plane and as an extension of the second adapter exterior surface 221, and having a second tab thickness 260$t$ extending from the second adapter exterior surface 221 in the interior direction to partly the depth of the second adapter thickness 220$t$. The second tab 260 has a second tab mount hole 282 on a second adapter-brake mount axis 285.

In the illustrated embodiment, the second portion 220 of the carrier adapter 200 is further configured with a third tab 230 positioned along the front-rear vertical plane of the second adapter portion 220 and substantially middle distant between be the front and the rear of the second adapter portion 220, with a third tab exterior surface 255 extending in the top direction away from the second adapter top surface 223 opposing a third tab interior surface 256 that is an uninterrupted vertical extension of the first adapter interior surface 212. The third tab 230 has a third tab total thickness 230$t$ with a third tab exterior thickness 231$t$ partially overlapping the second adapter top surface 223 in the exterior direction. The third tab 230 has a third tab mount hole 281 on a third adapter-brake mount axis 284.

Figure 6A:
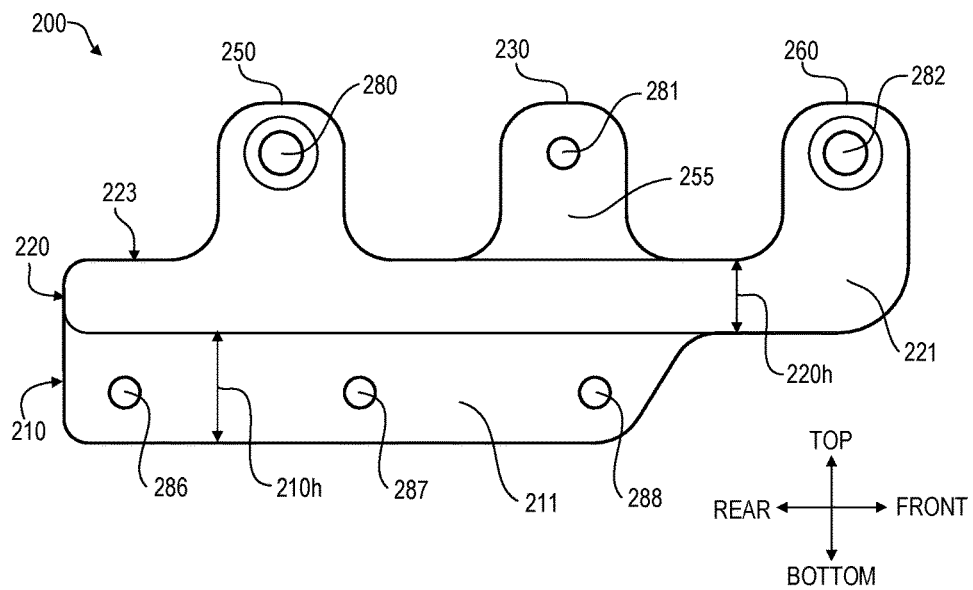
FIG. 6A shows an exterior plan view of the carrier adapter of FIG. 2.

FIG. 6A illustrates an exterior plan view of the carrier adapter 200 according to an example embodiment. The carrier adapter 200 exterior plan view includes the first adapter portion 210 having the first adapter portion height 210$h$, the first adapter exterior surface 211, and the plurality of guard-adapter mount holes 286, 287, 288. The carrier adapter 200 further includes the second adapter portion 220 having the second adapter height 220$h$, the second adapter exterior surface 221 and the second adapter top surface 223. The first tab 250 is positioned substantially proximate the rear of the second adapter portion 220 extending vertically in a top direction front-rear plane away from the second adapter top surface 223 as an extension of the second adapter exterior surface 221 and has the first tab mount hole 280. The second tab 260 is positioned substantially proximate the front of the second adapter portion 220 extending vertically in a top direction front-rear plane away from the second adapter top surface 223 as an extension of the second adapter exterior surface 221 and has the second tab mount hole 282. And, the third tab 230 is positioned substantially equidistant between the front and the rear of the second adapter portion 220 extending vertically in a top direction front-rear plane away from the second adapter top surface 223 with the third tab exterior surface 255 and has the third tab mount hole 281.

Figure 6B:
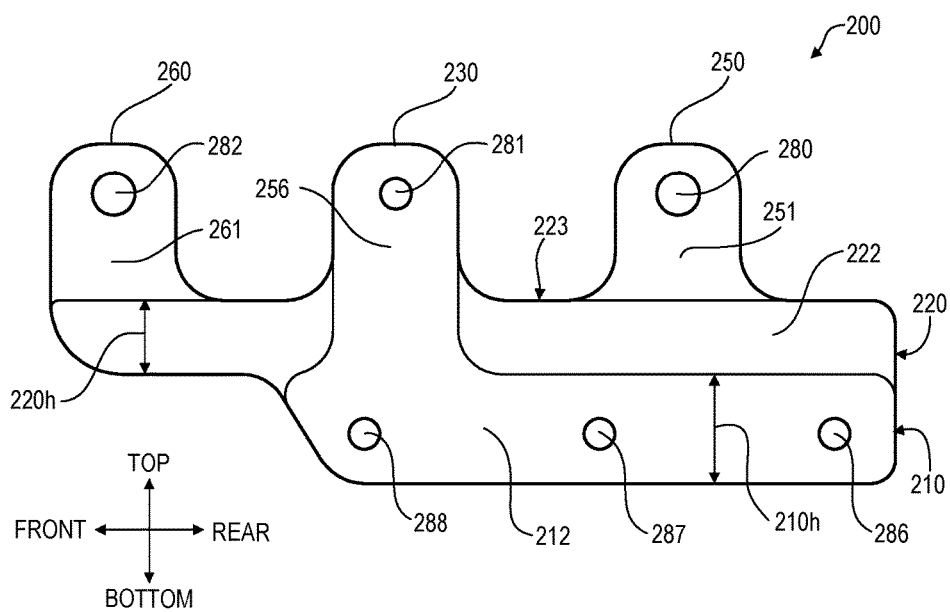
FIG. 6B shows an interior plan view of the carrier adapter of FIG. 2.

FIG. 6B illustrates an interior plan view of the carrier adapter 200 according to an example embodiment. The carrier adapter 200 interior plan view illustrates the first adapter portion 210 having the first adapter interior surface 212 and first adapter portion height 210h, and the plurality of guard-adapter mount holes 286, 287, 288. The carrier adapter 200 interior plan view further illustrates the second adapter portion 220 having the second adapter interior surface 222 the second adapter top surface 223 and the second adapter height 220h. The carrier adapter 200 interior plan view further illustrates the first tab 250 positioned substantially proximate the rear of the second adapter portion 220 extending in the top direction away from the second adapter top surface 223 and having the first tab interior surface 251 and the first tab mount hole 280. The carrier adapter 200 further includes the second tab 260 positioned substantially proximate the front of the second adapter portion 220 extending in the top direction away from the second adapter top surface 223 and having the second tab interior surface 261 and the second tab mount hole 282. The carrier adapter 200 further includes the third tab 230 positioned substantially equidistant between the front and the rear of the second adapter portion 220 with the third tab mount hole 281 and a third tab interior surface 256 that is a substantially continuous vertical extension of the first adapter interior surface 212 of the first adapter portion 210.

FIG. 6C illustrates a rear plan view of the carrier adapter 200. The carrier adapter 200 rear plan view illustrates the first adapter portion 210 having the first adapter interior surface 212 opposite the first adapter exterior surface 211, the first adapter portion height 210h, the first adapter portion thickness 210t and the guard-adapter axis 106 which in the rear plan view is the rear-most one of the plurality of guard-adapter axes 106, (107, 108 not shown) for the plurality of guard-adapter mount holes (286, 287, 288 not shown). The carrier adapter 200 rear plan view further illustrates the second adapter portion 220 having the second adapter interior surface 222 opposite the second adapter exterior surface 221, the second adapter top surface 223 opposite a cantilever bottom surface 224, the second adapter height 220h the second adapter thickness 220t, and the cantilever 220c having the cantilever thickness 220ct. The carrier adapter 200 rear plan view further illustrates the first tab 250 positioned substantially proximate the rear of the second adapter portion 220 extending in the top direction away from the second adapter top surface 223 having the first tab thickness 250t that is at least part of the second adapter thickness 220t, and sharing and being an extension of the second adapter exterior surface 221, and having the first adapter-brake mount axis 283. The carrier adapter 200 rear plan view further illustrates the third tab 230 positioned at a substantially middle distance between the front and the rear of the second adapter portion 220 and extending in the top direction away from the second adapter top surface 223, having the third tab interior surface 256 with a third tab total thickness 230t that is the sum of the third tab interior thickness 256t and the third tab exterior thickness 255t, and a third tab exterior height that is substantial equal to the first tab height 250h when measured in the top direction from the second adapter top surface 223.

Figure 3:
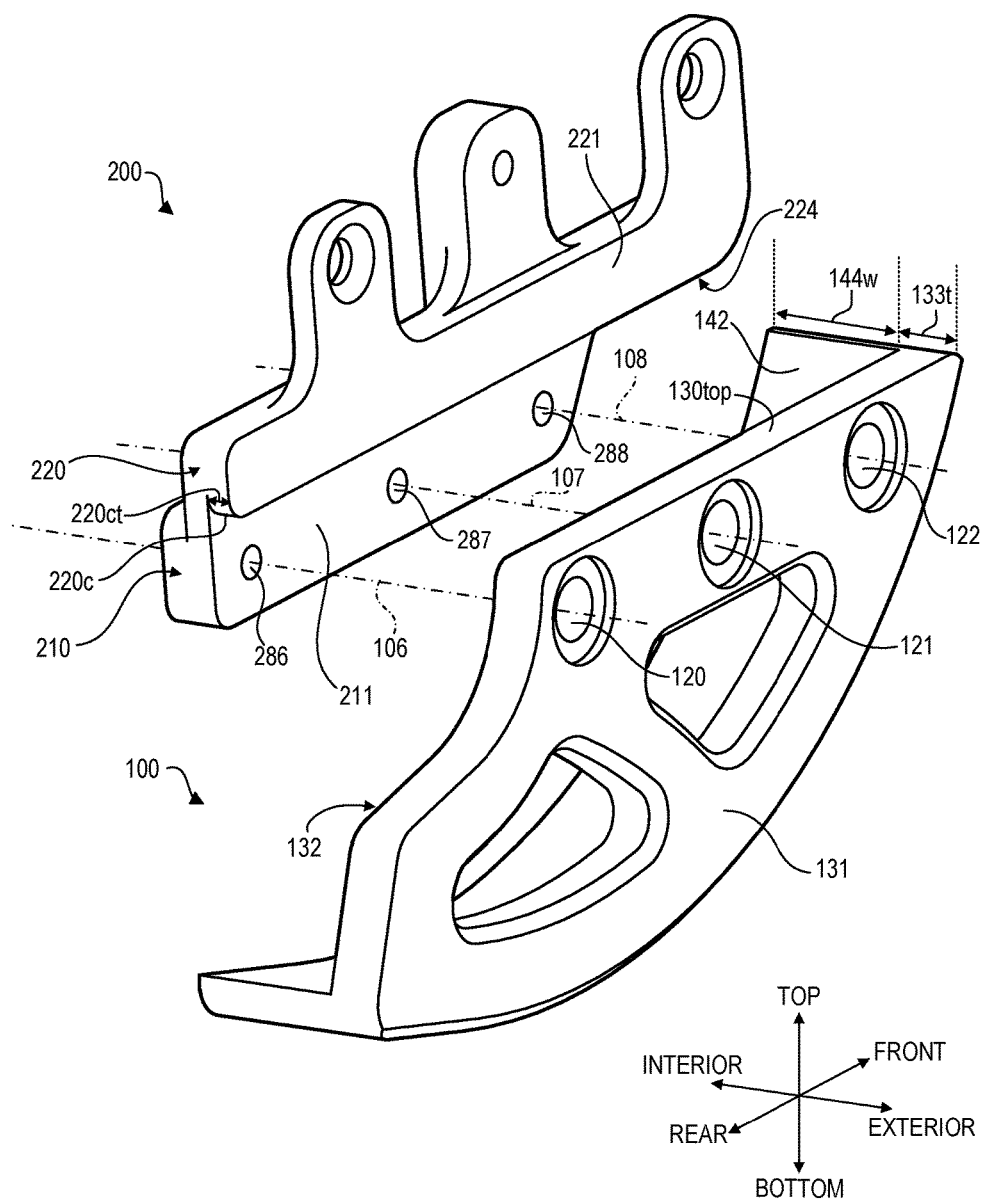
FIG. 3 shows an exploded top rear exterior perspective view of a disc guard assembly including the disc guard of FIG. 1 and the carrier adapter of FIG. 2, according to an embodiment of the present disclosure.

Turning now to FIG. 3, this figure illustrates a top rear exterior perspective view of the disc guard assembly in a exploded mating orientation between disc guard assembly components that include the disc guard 100 and the carrier adapter 200, being oriented with a corresponding top-bottom axis, front-rear axis, and exterior-interior axis. The disc guard 100 and the carrier adapter 200 are configured to be removably attached along the plurality of guard-adapter axes 106, 107, 108 with removable fasteners (see FIG. 4) through the plurality of disc guard mount holes 120, 121, 122 of the disc guard 100 and corresponding ones of the plurality of guard-adapter mount holes 286, 287, 288 of the carrier adapter 200. When removably attached, the first adapter exterior surface 211 and the first guard interior surface 132 are juxtaposed, and the first guard top surface 130top having the first guard thickness 133t is juxtaposed to the cantilever bottom surface 224 of the cantilever 220c that extends in an exterior direction away from the first adapter exterior surface 211 for the cantilever thickness 220ct. Further when removably attached, the second guard width 144w of the second guard interior surface 142 along the front of the disc guard 100 is juxtaposed with the front surface of the first adapter portion 210 below the cantilever 220c.

Figure 4:
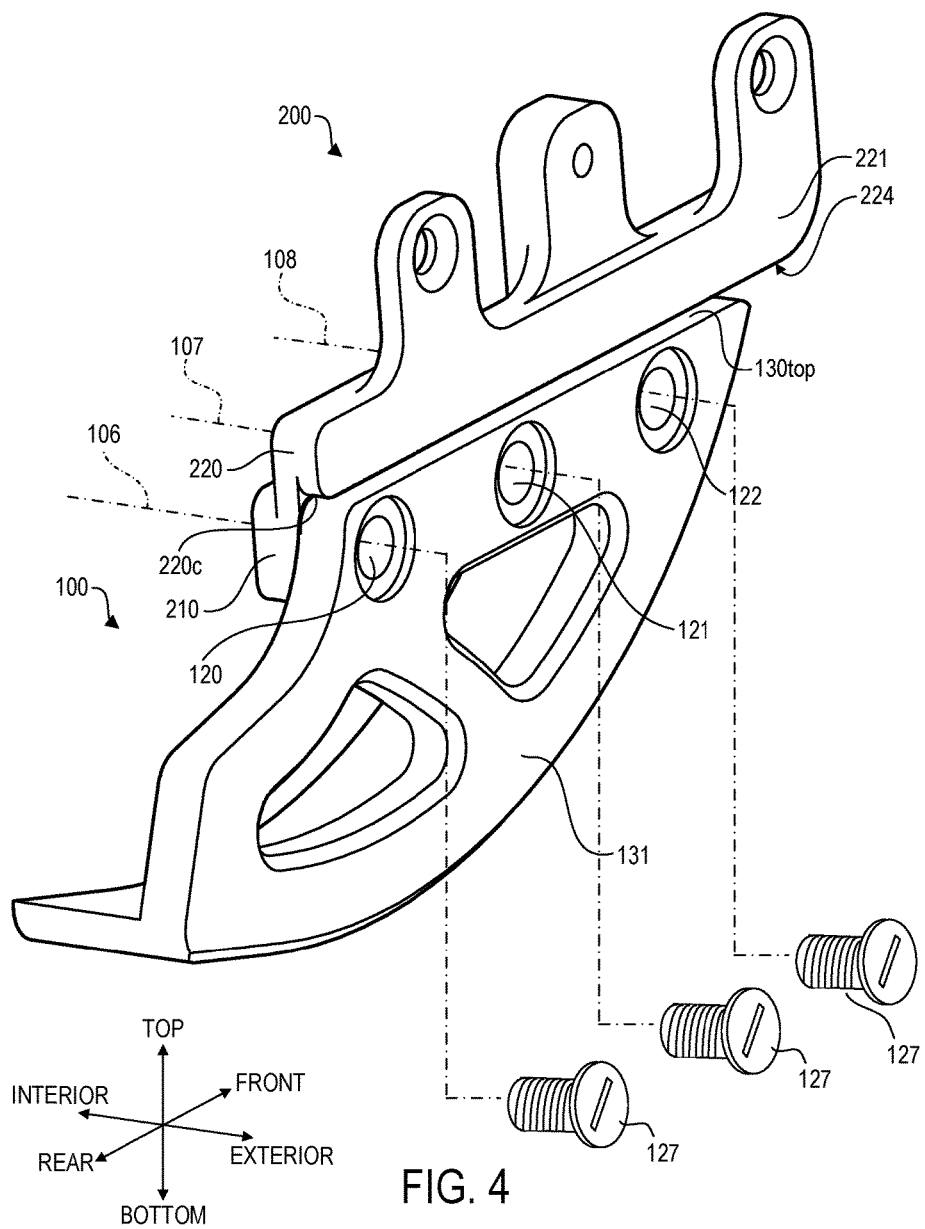
FIG. 4 shows assembled top rear exterior perspective view of the disc guard assembly of FIG. 3.

FIG. 4 illustrates a top rear exterior perspective view of the disc guard assembly that includes the disc guard 100 and the carrier adapter 200 in removably attached position with the corresponding top-bottom axis, front-rear axis, and exterior-interior axis according to an example embodiment. When removably attached as shown, the first adapter portion 210 and the first guard portion 130 are juxtaposed, and the first guard top surface 130top is juxtaposed the cantilever bottom surface 224 of the cantilever 220c, and the second adapter exterior surface 221 and the first guard exterior surface 131 are aligned along a substantially continuous vertical exterior plane. When removably attached as shown, the disc guard 100 and the carrier adapter 200 are removably attached with removable disc guard fasteners 127 individually through each of the plurality of disc guard mount holes 120, 121, 122 and correspondingly through each of the plurality of guard-adapter mount holes (286, 287, 288 not shown) aligned along the plurality of guard-adapter axes 106, 107, 108 so that the disc guard 100 is held securely and immovably in position against the first adapter portion 210 under the cantilever bottom surface 224 of the second adapter portion 220. Removable fasteners 127 can be of a suitable removable type including but not limited to screws, rivets, bolts and nuts, tie-ins, and the like, and of materials including but not limited to metal, plastic, rubberized, breakaway, rigid and flexible materials, and the like.

The number of removable fasteners employed to removably attach the disc guard 100 and the carrier adapter 200 through a corresponding number of mount holes in the disc guard 100 and the carrier adapter 200 can vary depending on factors including but not limited to weight, strength, back-up mount desirability in the event of failure of one or more removable fastener, ease of attachment/removal, and the like so long as the end result is that the disc guard 100 is affixed or secured or immobilized, in a position juxtaposed against the first adapter portion 210 under the cantilever bottom surface 224 of the second adapter portion 220. For this reason in one embodiment when viewing FIG. 3, the first guard thickness 133t of the first guard top surface 130top and the cantilever thickness 220ct of the cantilever bottom surface 224 have substantially similar thicknesses thereby keeping the disc guard 100 in position and immovable without space for movement when the disc guard 100 and the carrier adapter 200 are removably attached with a removable fastener individually through each of the plurality of disc guard mount holes 120, 121, 122 and correspondingly through each of the plurality of guard-adapter mount holes 286, 287, 288 each correspondingly centered the plurality of guard-adapter axes 106, 107, 108.

In another embodiment, the first guard thickness 133t of the first guard top surface 130top and the cantilever thickness 220*ct* of the cantilever bottom surface 224 may have unequal thicknesses provided that the cantilever thickness 220*ct* overlaps at least part of the front to rear distance of the first guard top surface 130*top* to keep the disc guard 100 in position and immovable without space for movement when the disc guard 100 and the carrier adapter 200 are removably attached with removable fasteners individually through each of the plurality of disc guard mount holes 120, 121, 122 and correspondingly through each of the plurality of guard-adapter mount holes 286, 287, 288 each correspondingly centered on the plurality of guard-adapter mount axes 106, 107, 108.

With the disc guard 100 positioned against the first adapter exterior surface 211 under the cantilever bottom surface 224 of the carrier adapter 200, the first guard portion 130 in one example embodiment is configured with at least one disc guard mount hole and correspondingly at least one guard adapter mount hole both centered on at least one guard-adapter mount axis at an optimal point along the front to rear distance of the top of the first guard portion 130 and the corresponding front to rear distance of the first adapter portion 210. In another example embodiment the first guard portion 130 is configured with at least two disc guard mount holes and correspondingly at least two guard adapter mount holes each centered on at least two guard-adapter mount axes shared by the disc guard 100 and the carrier adapter 200 and optimally positioned for fastening strength and stability along the front to rear distance of the top of the first guard portion 130 and the corresponding front to rear distance of the first adapter portion 210.

FIG. 5A illustrates a front plan view of the disc guard assembly that includes the disc guard 100 and the carrier adapter 200 in a removably attached position. When removably attached as shown, the disc guard 100 and the carrier adapter 200 are attached with removable fasteners individually through each of the plurality of disc guard mount holes 120, 121, 122, and the first guard top surface 130*top* and the cantilever bottom surface 224 are juxtaposed so that the first guard exterior surface 131 and the second adapter exterior surface 221 are aligned along a substantially continuous vertical front-rear exterior plane. The carrier adapter 200 includes the second adapter portion 220 having the second adapter exterior surface 221, the first tab 250 positioned substantially proximate the rear of the second adapter portion 220 extending vertically in a top direction front-rear plane away from the second adapter top surface 223 as an extension of the second adapter exterior surface 221 and having the first tab mount hole 280, the second tab 260 positioned substantially proximate the front of the second adapter portion 220 extending vertically in a top direction front-rear plane away from the second adapter top surface 223 as an extension of the second adapter exterior surface 221 and having the second tab mount hole 282, and the third tab 230 positioned substantially equidistant between the front and the rear of the second adapter portion 220 extending vertically in a top direction front-rear plane away from the second adapter top surface 223 with the third tab exterior surface 255 and the third tab mount hole 281.

FIG. 5A further illustrates the first guard exterior surface 131, the at least one disc guard opening 150, 151, and the disc guard distal edge 134 having the substantially curvilinear shape substantially approximating a disc perimeter 20, the disc guard distal edge 134 extending in a nadir-posterior direction from the disc guard front point 134*a* toward the disc guard rear point 134*b* with a disc guard nadir point 134*c* proximate a first line 11 that is substantially vertical as a plumb-line below a disc center axis point 10. It will be appreciated that the perimeter 20 is shown roughly and schematically in FIG. 5A, whereas a true circular shape of the disc is more accurately illustrated in FIG. 12. In one example embodiment, the disc guard distal edge 134 (and the second guard portion 140 shown in FIG. 1) having a substantially curvilinear shape approximating the disc perimeter 20 is a substantially consistent arc corresponding to the disc perimeter 20. In another example embodiment, the disc guard distal edge 134 shape (and the second guard portion 140 shown in FIG. 1) may be a multi-edged geometric shape approximating the disc perimeter 20. In the example embodiments of the disc guard distal edge 134 shape (and the second guard portion 140 shown in FIG. 1) including but not limited to those mentioned above, the disc guard distal edge 134 and corresponding shape of the second guard portion 140, and the first guard portion 130, are configured to be proximate the disc 15 (see FIG. 5C) while allowing sufficient operational clearance for the disc 15 and the disc perimeter 20. The disc guard rear point 134*b* in one embodiment is proximate the disc guard nadir point 134*c* that is positioned at a point along the disc guard distal edge 134 proximate the intersecting point of the first line 11 that is substantially vertical as a plumb-line below the disc center axis 10, thereby positioning the disc guard 100 to deflect objects coming from the rear and bottom directions and shield the disc 15 from object impacts. The disc guard rear point 134*b* in another embodiment is to the posterior of the disc guard nadir point 134*c* along the disc guard distal edge 134 substantially at a point where the extended shape of the disc guard distal edge 134 is intersected by a second line 12 originating from a disc center axis point 10 at angle θ° 14 to the posterior of the first line 11 originating from the disc center axis point 10 thereby further positioning the disc guard 100 to deflect foreign objects coming from all directions and shield the disc 15 from object impacts.

FIG. 5B illustrates a rear plan view of the disc guard assembly that includes the disc guard 100 and the carrier adapter 200 in a removably attached position. When removably attached as shown, the disc guard 100 and the carrier adapter 200 are attached with removable fasteners individually through each of the plurality of guard-adapter mount holes 286, 287, 288 in the first guard portion 210. As illustrated in the rear plan view, the carrier adapter 200 further includes the first adapter interior surface 212 and the second adapter portion 220 with second adapter interior surface 222 and second adapter top surface 223. The carrier adapter 200 further includes the first tab 250 positioned substantially proximate the rear of the second adapter portion 220 extending in the top direction away from the second adapter top surface 223 and having the first tab interior surface 251 and the first tab mount hole 280. The carrier adapter 200 further has the second tab 260 positioned substantially proximate the front of the second adapter portion 220 extending in the top direction away from the second adapter top surface 223 and has the second tab interior surface 261 and the second tab mount hole 282. The carrier adapter 200 further includes the third tab 230 positioned substantially equidistant between the front and the rear of the second adapter portion 220 with the third tab mount hole 281 and a third tab interior surface 256 that is a substantially continuous vertical extension of the first adapter interior surface 212 of the first adapter portion 210.

FIG. 5B further illustrates in the rear plan view of the disc guard 100, the first guard interior surface 132, the at least one disc guard opening 150 and 151, and the second guard portion 140 having the second guard thickness 143*t* with the substantially curvilinear shape extending in a nadir-posterior direction from the disc guard front point 134a toward the disc guard nadir point 134c and the disc guard rear point 134b.

FIG. 5C illustrates a rear plan view of the disc guard assembly that includes the disc guard 100 and the carrier adapter 200 in removably attached position along with the proximity of the disc 15 with disc perimeter 20, a disc perimeter edge thickness 15t, and axis at the disc center axis point 10. When removably attached as shown, many interior surfaces are proximate to but operationally clear of the disc 15, the interior surfaces including but are not limited to the first guard interior surface 132 of the first guard portion 130, the second guard interior surface 142 of the second guard portion 140, the first adapter interior surface 212 of the first adapter portion 210 and its vertical extension into the third tab interior surface 256, and the second adapter interior surface 222 of the second adapter portion 220. The rear plan view of FIG. 5C further illustrates the first guard portion 130 with the first guard exterior surface 131 opposite the first guard interior surface 132, the first guard thickness 133t, the disc guard distal edge 134, the disc guard rear point 134b and the disc guard nadir point 134c, and further illustrates the second guard portion 140 with the second guard interior surface 142, the second guard thickness 143t and the second guard width 144w. The rear plan view of FIG. 5C further illustrates the first adapter portion 210 having the first adapter thickness 210t and the first adapter height 210h, and the first adapter interior surface 212 opposite the first adapter exterior surface 211, and further illustrates the second adapter portion 220 having the second adapter thickness 220t and the second adapter height 220h, the cantilever 220c having the cantilever thickness 220ct, the second adapter interior surface 222 opposite the second adapter exterior surface 221, the third tab 230 having the third tab total thickness 230t with the third tab interior surface 256 opposite the third tab exterior surface 255, and the first tab 250 having the first tab thickness 250t with the first tab interior surface 251 opposite the vertical extension of the second adapter exterior surface 221.

FIG. 7A illustrates a exterior plan view of the carrier adapter 200 and a rear brake carrier mount 300 in an exploded orientation. The rear brake carrier mount 300 front plan view includes a rear axle hole 310, a first brake carrier mount hole 311 and a second brake carrier mount hole 312 for mounting the rear brake carrier mount 300 to a motorcycle frame, a swing arm guide channel 313, a brake carrier exterior surface 320, a brake carrier overlap surface 321, a brake carrier bottom surface 323, a first tab receiving slot 350 positioned on the exterior side substantially proximate the bottom-rear of the rear brake carrier mount 300 with a first tab receiving mount hole 380, a second tab receiving slot 360 positioned on the exterior side substantially proximate the bottom-front of the rear brake carrier mount 300 with a second tab receiving mount hole 382, and a third tab receiving slot 330 positioned on the interior side substantially proximate the bottom middle distance of the rear brake carrier mount 300 with a third tab receiving mount hole 381. The front plan view illustrates that the carrier adapter 200 includes the first adapter portion 210 having the first adapter portion height 210h, and the first adapter exterior surface 211. When mating with the rear brake carrier mount 300, the carrier adapter 200 engages from the bottom direction and in the same front-rear vertical plane as the rear brake carrier mount 300 so that each of the tabs of the carrier adapter 200 engages the corresponding tab receiving slot from the bottom direction of the rear brake carrier mount 300 in a manner such that the first tab 250 and the second tab 260 engage the brake carrier exterior surface 320 and the third tab 230 engages the opposite rear brake carrier interior surface (332 in FIG. 8A) to secure or sandwich, capture, immobilize, embrace, and grip the rear brake carrier mount 300 therebetween, and the second adapter top surface 223 is juxtaposed to the brake carrier bottom surface 323 in this orientation.

FIG. 7B illustrates an exterior plan view of the carrier adapter 200 and the rear brake carrier mount 300 in a removably attached position. The carrier adapter 200 and the rear brake carrier mount 300 can be secured with removable fasteners (see FIG. 9) through each corresponding pairing of the first tab mount hole 280 and the first tab receiving mount hole 380, the second tab mount hole 282 and the second tab receiving mount hole 382, and the third tab mount hole 281 and the third tab receiving mount hole 381. When removably attached, the brake carrier exterior surface 320 and the second adapter exterior surface 221 form a substantially continuous exterior surface, and the second adapter top surface 223 is juxtaposed with the brake carrier bottom surface 323, and the rear brake carrier mount 300 is sandwiched along the front-rear vertical plane between the third tab 230 on the interior side of the rear brake carrier mount 300 and the first tab 250 and second tab 260 on the exterior side of the rear brake carrier mount 300.

Figure 8B:
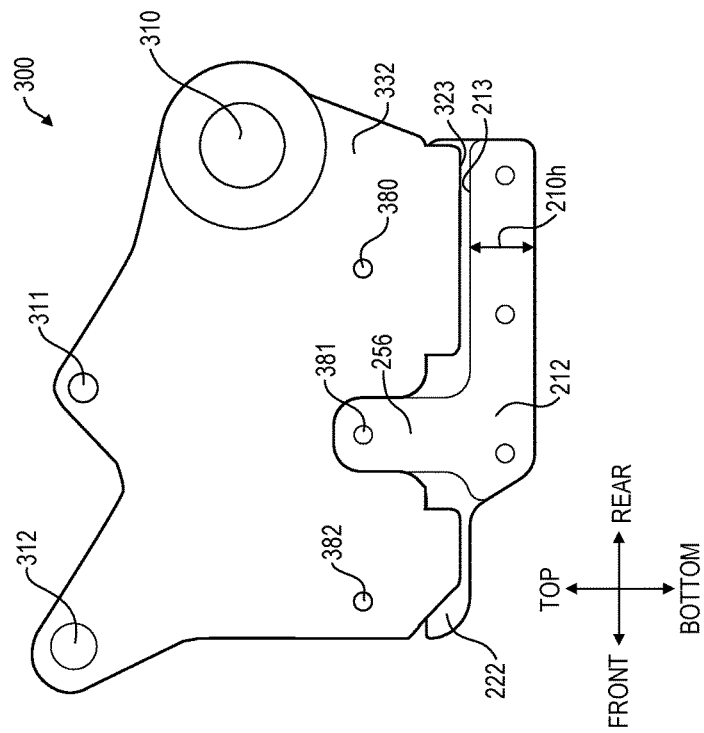
FIG. 8B shows an interior plan view of the carrier adapter and rear brake carrier mount of FIG. 7A, in a removably attached configuration.
Figure 8A:
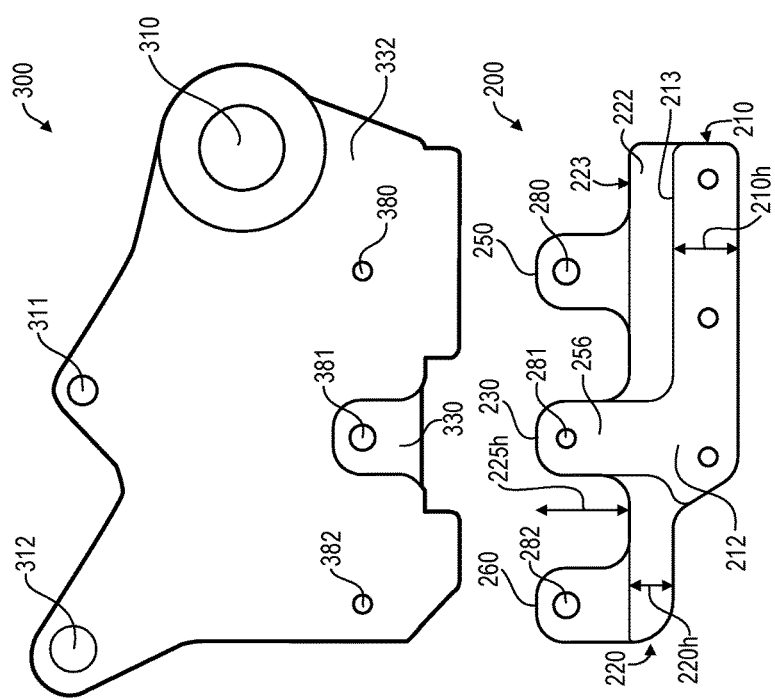
FIG. 8A shows an interior plan view of the carrier adapter and the rear brake carrier mount of FIG. 7A.

FIG. 8A illustrates an interior plan view of the carrier adapter 200 and the rear brake carrier mount 300 in an exploded orientation. As shown, the rear brake carrier mount 300 includes the rear axle hole 310, the first brake carrier mount hole 311 and the second brake carrier mount hole 312 for mounting the rear brake carrier mount 300 to the motorcycle frame, a brake carrier interior surface 332 extending in the bottom direction into a brake carrier overlap interior surface 322, a brake carrier bottom surface 323, the first tab receiving mount hole 380, the second tab receiving mount hole 382, and the third tab receiving slot 330 on the brake carrier interior surface 332 substantially proximate the bottom middle distance between the front and rear of the rear brake carrier mount 300 with the third tab receiving mount hole 381. As shown, the carrier adapter 200 includes the first adapter portion 210 having the first adapter portion height 210h, and the first adapter interior surface 212. When mating with the rear brake carrier mount 300, the carrier adapter 200 engages from the bottom direction and in the same front-rear vertical plane as the rear brake carrier mount 300 so that each of the tabs of the carrier adapter 200 engages the corresponding tab receiving slot from the bottom direction of the rear brake carrier mount 300 in a manner such that the first tab 250 and the second tab 260 engage the brake carrier exterior surface (320 in FIG. 7A) and the third tab 230 engages the opposite brake carrier interior surface 332 to secure, sandwich, capture, immobilize, embrace, and grip the rear brake carrier mount 300 therebetween, and in this orientation the second adapter top surface 223 is juxtaposed to the brake carrier bottom surface 323.

FIG. 8B illustrates an interior plan view of the carrier adapter 200 and the rear brake carrier mount 300 in a removably attached position. The carrier adapter 200 and the rear brake carrier mount 300 can be secured with removable fasteners (see FIG. 9) through each overlapping pairing of the first tab mount hole 280 and the first tab receiving mount hole 380, the second tab mount hole 282 and the second tab receiving mount hole 382, and the third tab mount hole 281 and the third tab receiving mount hole 381. When removably attached, the brake carrier interior surface 332 and the first carrier interior surface 212 that extends into the third tab interior surface 256 form a substantially continuous interior surface, the first carrier top surface 213 is juxtaposed with the brake carrier bottom surface 323, the interior surfaces of the first tab 250 and the second tab 260 are juxtaposed the exterior surfaces of the first tab receiving slot 350 and the second tab receiving slot 360, and the exterior tab surface 255 is juxtaposed the interior surface of the third tab receiving slot 330, so that the rear brake carrier mount 300 is sandwiched along the front-rear vertical plane between the third tab 230 on the interior side and the first tab 250 and second tab 260 on the exterior side.

FIG. 9 illustrates a top rear exterior perspective view of a mating orientation of the rear brake carrier assembly that includes the rear brake carrier mount 300 and the disc guard assembly which includes the disc guard 100 and the carrier adapter 200, illustrated with a common orientation relative to a shared top-bottom axis, front-rear axis, and exterior-interior axis. The disc guard assembly components that include the disc guard 100 and the carrier adapter 200 are configured to be removably attached along the plurality of guard-adapter axes 106, 107, 108 with removable fasteners (see also FIG. 4) that utilize the plurality of disc guard mount holes 120, 121, 122 of the disc guard 100 and the plurality of guard-adapter mount holes 286, 287, 288 of the carrier adapter 200. When removably attached, the first adapter portion 210 and the first guard portion 130 are juxtaposed vertically and the first guard portion 130 is positioned below the cantilever 220c of the second carrier portion 220. The carrier adapter 200 and the rear brake carrier mount 300 are configured to be removably attached along a plurality of adapter-brake mount axes 283, 284, 285, with removable fasteners that utilize the mount hole parings of the plurality of carrier adapter tab mount holes 289, 281, 282 corresponding to each of the first tab 250 the second tab 260 and the third tab 230, and the plurality of tab receiving mount holes 380, 381, 382 corresponding to each of the first tab receiving slot 350 the second tab receiving slot 360 and the third tab receiving slot 330 (not shown) of the rear brake carrier mount 300.

Figure 10:
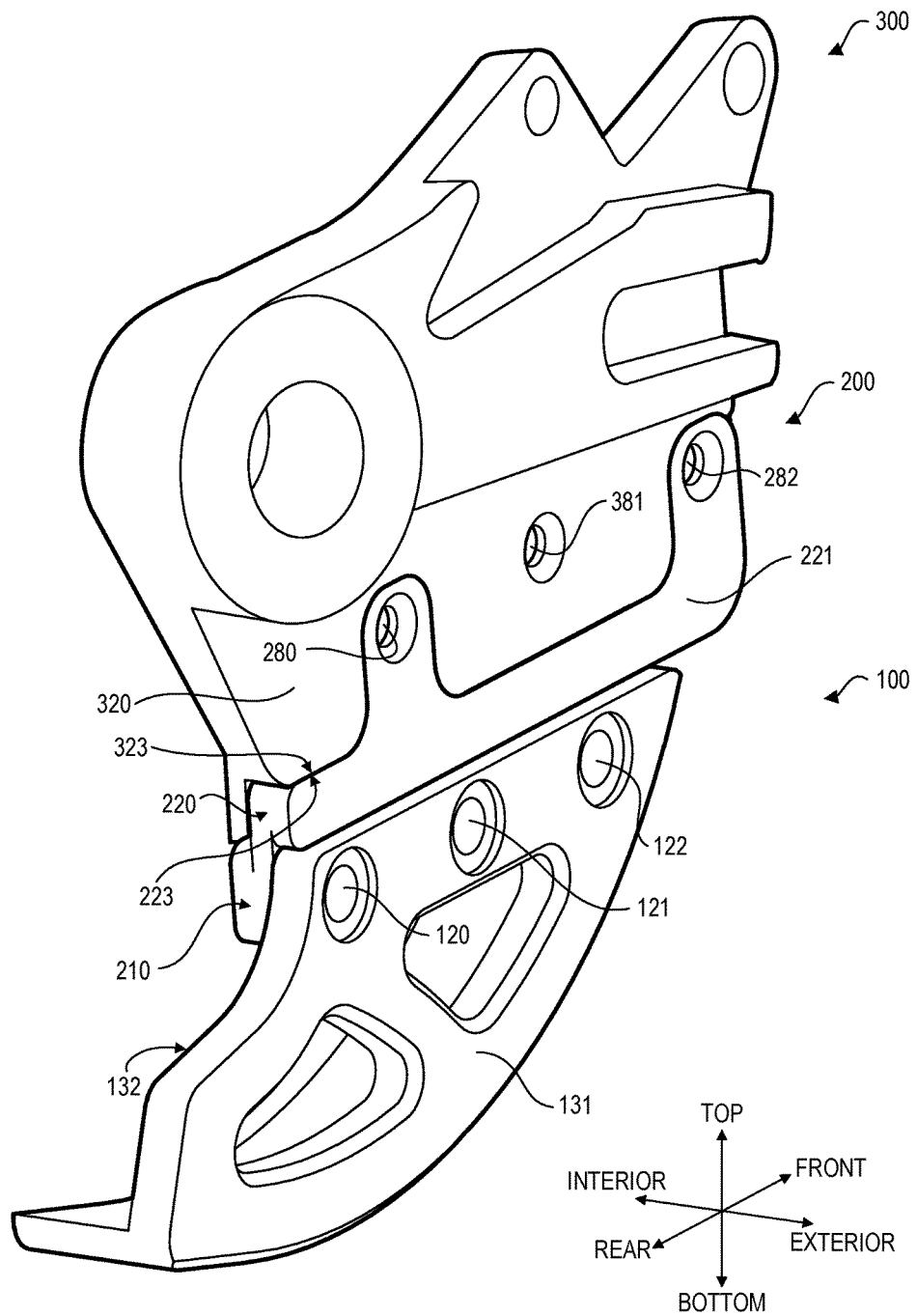
FIG. 10 shows a top rear exterior perspective view of the rear brake carrier mount of FIG. 7A and the disc guard assembly of FIG. 3, in a removably attached configuration.

FIG. 10 illustrates a top rear exterior perspective view of the full rear brake carrier assembly that includes the disc guard assembly of the disc guard 100 removably attached to the carrier adapter 200, and the carrier adapter 200 of the disc guard assembly removably attached to the rear brake carrier mount 300 with shared corresponding top-bottom axis, front-rear axis, and exterior-interior axis according to an example embodiment. The disc guard 100 and the carrier adapter 200 are removably attached with removable fasteners through the plurality of disc guard mount holes 120, 121, 122 of the disc guard 100 (see FIGS. 4 and 9). When removably attached as shown, the second adapter exterior surface 221 and the first guard exterior surface 131 are aligned along a substantially continuous top-bottom exterior plane. The further removable connection of the carrier adapter 200 and the rear brake carrier mount 300 is secured with removable fasteners through each overlapping pairing of the first tab mount hole 280 and the first tab receiving mount hole 380 (not shown), the second tab mount hole 282 (not shown) and the second tab receiving mount hole 382, and the third tab mount hole 281 and the third tab receiving mount hole 381 (not shown). When removably attached, the brake carrier exterior surface 320 the second adapter exterior surface 221 and the first guard exterior surface 131 form a substantially continuous exterior surface.

FIG. 11 illustrates a rear plan view of the full rear brake carrier assembly that includes the rear brake carrier mount 300 and the disc guard assembly that includes the disc guard 100 and the carrier adapter 200, each when removably attached are oriented in a position proximate to the disc 15 as shown. The disc 15 includes the disc perimeter 20, the disc perimeter edge thickness 15t, and the disc center axis point 10 along which the rear axle of the motorcycle rear wheel is horizontally aligned as it passes through the disc 15 and the rear axle hole (310 not shown) of the rear brake carrier mount 300. The rear brake carrier mount 300 also is the component on which a rear brake caliper housing (not shown) is mounted for its access to the disc 15, along with the disc guard assembly that includes the disc guard 100 and the carrier adapter 200. When removably attached as shown, many interior surfaces of the disc guard assembly (100, 200) are proximate to but operationally clear of the disc 15, the interior surfaces including but not limited to the first guard interior surface 132 of the first guard portion 130, the second guard interior surface 142 of the second guard portion 140, the first adapter interior surface 212 of the first adapter portion 210 and its vertical extension into the third tab interior surface 256, the second adapter interior surface 222 of the second adapter portion 220, and the brake carrier interior surface 332 itself. The rear plan view of the disc guard 100 and the carrier adapter 200 illustrates the first guard portion 130 with the first guard exterior surface 131 opposite the first guard interior surface 132, and the second guard portion 140 with the second guard interior surface 142. The rear plan view of the disc guard assembly (100, 200) further illustrates the first adapter portion 210 having the first adapter interior surface 212, the second adapter portion 220 being cantilevered in an exterior direction away from the first adapter portion 210, and the rear brake carrier mount 300 itself with the brake carrier interior surface 332 opposite the brake carrier exterior surface 320. The carrier adapter 200, when removably attached to the rear brake carrier mount 300, orients the disc guard 100 so that the first guard portion 130 of the disc guard 100 is in parallel proximity to the disc 15 vertical surface and the second guard portion 140 of the disc guard 100 is in parallel proximity to the disc perimeter edge thickness 15t.

Figure 12:
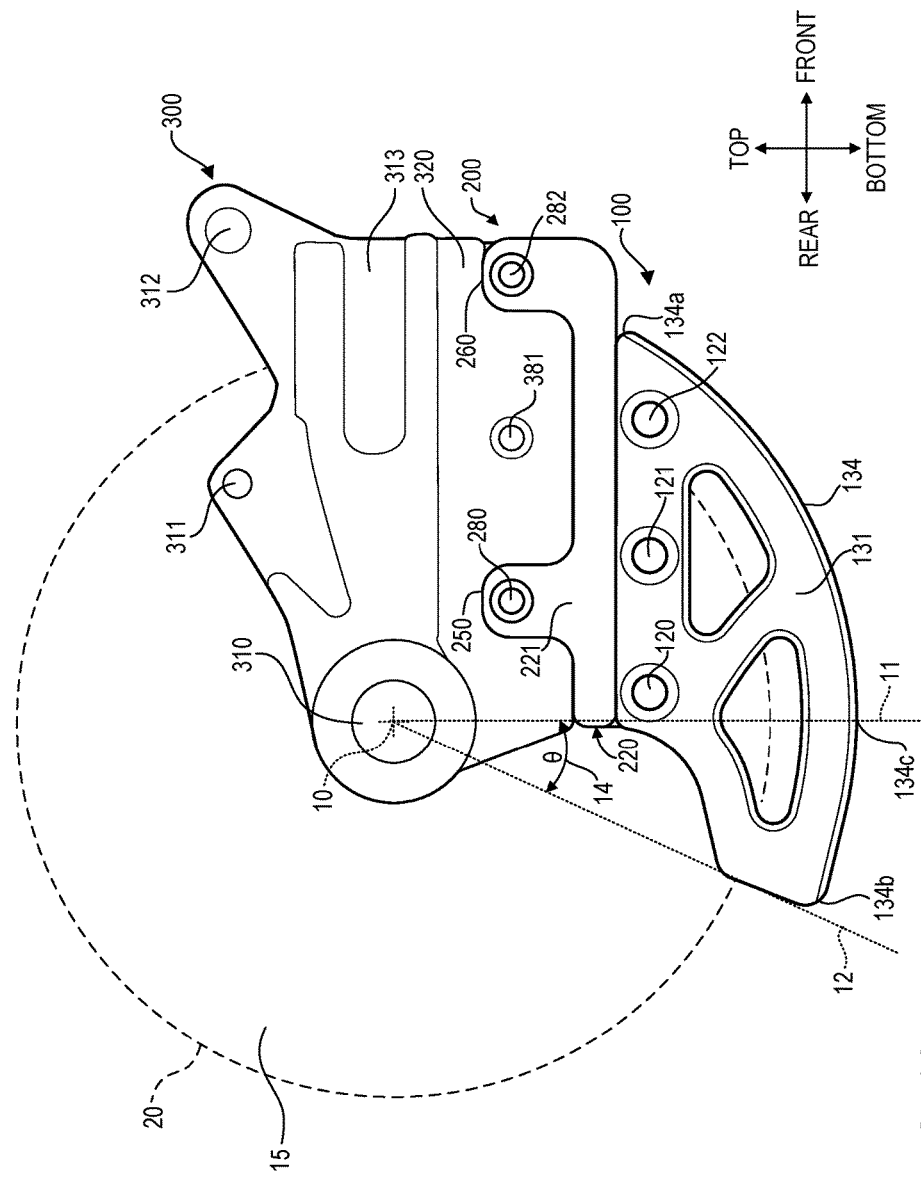
FIG. 12 shows an exterior plan view of the rear brake carrier mount of FIG. 7A and the disc guard assembly of FIG. 3, in a removably attached configuration.

FIG. 12 illustrates an exterior plan view of the full rear brake carrier assembly that includes the rear brake carrier mount 300 and the disc guard assembly that further includes the disc guard 100 and the carrier adapter 200, each in their removably attached positions proximate to the disc 15. The disc 15 includes the disc perimeter 20 and the disc center axis point 10 along which the rear axle of the motorcycle rear wheel is horizontally aligned as it passes through the disc 15 and the rear axle hole 310 of the rear brake carrier mount 300. The rear brake carrier mount 300 also is the component on which a rear brake caliper housing (not shown) is mounted for its access to the disc 15, as well as the disc guard assembly of the disc guard 100 and the carrier adapter 200 as shown. When removably attached as shown, the disc guard 100 and the carrier adapter 200 are attached with removable fasteners (see FIGS. 4 and 9) individually through each of the plurality of disc guard mount holes 120, 121, 122, and the disc guard 100 juxtaposed immediately below the second carrier portion 220 of the carrier adapter 200 and the first guard exterior surface 131 and the second adapter exterior surface 221 are aligned along a substantially continuous shared vertical exterior plane. The carrier adapter 200 includes the second adapter portion 220 having the second adapter exterior surface 221, the first tab 250 positioned substantially proximate the rear of the second adapter portion 220 extending vertically in a top direction as an extension of the second adapter exterior surface 221 and having the first tab mount hole 280, and the second tab 260 positioned substantially proximate the front of the second adapter portion 220 extending vertically in a top direction as an extension of the second adapter exterior surface 221 and having the second tab mount hole 282.

FIG. 12 further illustrates the disc guard 100 having the first guard exterior surface 131, the disc guard distal edge 134 with the substantially curvilinear shape approximating the disc perimeter 20, the disc guard distal edge 134 extending in a nadir-posterior direction from the disc guard front point 134a toward the disc guard rear point 134b with the disc guard nadir point 134c proximate the first line 11 originating from the disc center axis point 10 that intersects the disc guard distal edge 134. The disc guard rear point 134b is along the disc guard distal edge 134 substantially at a point where the disc guard distal edge 134 is intersected by a second line 12 originating from the disc center axis point 10 at angle θ° 14 to the posterior of the first line 11 originating from the disc center axis point 10. The removable connection of the carrier adapter 200 and the rear brake carrier mount 300 is secured with removable fasteners (see FIGS. 4 and 9) through each overlapping pairing of the first tab mount hole 280 and the first tab receiving mount hole 380, the second tab mount hole 282 and the second tab receiving mount hole 382, and the third tab mount hole 281 and the third tab receiving mount hole 381. When removably attached, the distal end of the rear brake carrier mount 300 is juxtaposed the second adapter portion 220 of the carrier adapter 200, and the first adapter portion 210 of the carrier adapter 200 is juxtaposed the disc guard 100 such that the full rear brake carrier assembly which includes the rear brake carrier mount 300 and the disc guard assembly (the carrier adapter 200 and the disc guard 100) are oriented proximate a face surface of the disc 15 with a central orienting point of the disc center axis point 10. In this orientation and configuration as shown, the disc guard assembly is positioned to shield the disc 15 from impact by objects that could otherwise damage the disc surface, shape, or constitution.

In the disc guard assembly, the carrier adapter 200 may be constructed of a metal or metal alloy composition and the disc guard 100 may be constructed of a substantially rigid plastic composition, such as ultra-high molecular weight nylon. The metal alloy composition of the carrier adapter 200 in one embodiment can be substantially similar to the composition of the rear brake carrier mount 300. For example, the metal alloy composition of the carrier adapter 200 can be aluminum or an aluminum alloy or any other metal alloy that satisfies criteria of light weight, material strength, and affordability among metal alloys suitable for the purpose. In one embodiment, the metal alloy composition of the carrier adapter 200 is lightweight, low cost, and has a material strength and elasticity at least equal to or greater than the material strength and elasticity of the substantially rigid plastic of the disc guard, so as to minimize the likelihood of failure and wear on the carrier adapter 200 and minimize the need for replacement. With the material strength and elasticity of the metal alloy composition, in combination with the removable attachment configuration of carrier adapter 200 and the plurality of tabs that engage to secure or sandwich or capture or immobilize or embrace or grip or hold the rear brake carrier mount 300 therebetween, the carrier adapter 200 is designed to withstand the rigors of use on-road and off-road and including racing conditions on-road and off-road, and to withstand an impacting force that would be sufficient to exceed a point of permanent deflection of the substantially rigid plastic composition of the disc guard 100, so that the carrier adapter 200 useful life is greater than the disc guard 100.

In one example embodiment, the plastic composition of the disc guard may be a thermoplastic. In another embodiment the substantially rigid plastic composition is of a composition and type that can be machined into the one-piece design as disclosed herein. During use, the disc guard 100 is exposed near the ground and with the largest surface area of exposure to impact resulting in a higher likelihood wear and damage, and a need will arise among users for replacement of the disc guard when it becomes worn. The present embodiments exhibit the advantage that the disc guard can be replaced simply by removal of one or more fasteners, without removing the carrier adapter. Further, the disc guard may be replaced without replacement of the carrier adapter, which is not as exposed and does not tend to wear as frequently, with resultant cost savings. The plastic composition of the disc guard 100 also allows for uniform coloring throughout the component so that chips, scratches, gauges, and other damage are relatively invisible because only the uniform color is ever exposed, rather than exposing a base coating under a colored top coat of paint. The lower cost, durable, light weight plastic of a removable disc guard 100 facilitates frequent replacement of one disc guard for another disc guard for any reason including but not limited to desirable colors schemes, caution markings, race sponsor logos or advertising or messaging or insignia or the like, either etched into the plastic itself or painted onto or adhered to or embedded within the plastic without limitation of any aforementioned combination or configuration. Further, as an advantage over metal disc guards, the substantially rigid plastic composition of the disc guard enables it to be resiliently deformable, such that impacts from objects of the ground do not permanently deform the disc guard, and thus permanent deflection and binding of the disc guard against the disc can be avoided, keeping the motorcycle ridable. This is of particular advantage during off road use in remote areas, where a disabled motorcycle can be a major inconvenience.

The subject matter of the present disclosure includes all novel and nonobvious combinations and subcombinations of the various processes, systems and configurations, and other features, functions, acts, and/or properties disclosed herein, as well as any and all equivalents thereof.

The invention claimed is:

1. A disc guard assembly for shielding a disc of a rear disc brake system on a motorcycle, the disc having a center axis, an interior side surface, an exterior side surface and a disc perimeter surface, and the rear disc brake system being configured with a rear brake carrier assembly attached to a structural frame of the motorcycle, the rear brake carrier assembly including a carrier body having a carrier mount hole, the disc guard assembly comprising:

a disc guard having a side wall configured to cover at least a portion of the exterior side surface of the disc as viewed from an exterior side in a first direction parallel to the center axis of the disc, the side wall having a top end portion with a disc guard mount hole formed therein, and a bottom portion, the disc guard further including a lateral wall extending toward an interior side in the first direction from the bottom portion and covering the disc perimeter surface as viewed from a bottom of the disc guard; and a carrier adapter having a body including a first adapter portion having a guard-adapter mount hole and a second adapter portion having an adapter-brake mount hole, the first adapter portion being positioned below the second adapter portion on the body;

wherein the carrier adapter is removably attached to the disc guard by a disc guard fastener extending through the guard-adapter mount hole and the disc guard mount hole, and wherein the carrier adapter is attached to a rear brake carrier mount by an adapter-brake mount fastener extending through the adapter-brake mount hole and the carrier mount hole.

2. The disc guard assembly of claim 1, wherein:
the disc guard is plastic.

3. The disc guard assembly of claim 1, wherein:
the carrier adapter is metal.

4. The disc guard assembly of claim 1, wherein a distal edge of the disc guard has a curved shape that substantially corresponds to a shape of the disc perimeter surface, as viewed from the first direction.

5. The disc guard assembly of claim 4,
wherein the distal edge extends from a disc guard anterior point at a front end of the top end portion, through a nadir point of the disc guard, to a disc guard posterior point.

6. The disc guard assembly of claim 1, wherein:
the second adapter portion is configured with at least two tabs each having a corresponding tab mount hole.

7. The disc guard assembly of claim 6, wherein:
a first of the at least two tabs is configured to engage a corresponding first tab receiving slot on a first side of the rear brake carrier mount, and a second of the at least two tabs is configured to engage a corresponding second tab receiving slot on a second side of the rear brake carrier mount opposite the first side with the rear brake carrier mount therebetween.

8. The disc guard assembly of claim 1, wherein the side wall is configured with at least one opening.

9. A disc guard assembly for shielding a disc of a rear disc brake system on a motorcycle, the rear disc brake system being configured with a rear brake carrier assembly having a rear brake carrier mount, the disc guard assembly comprising:
a disc guard; and
a carrier adapter including a first adapter portion configured to removably attach to the disc guard via a first fastener, and a second adapter portion configured to removably attach to the rear brake carrier mount by way of a second fastener,
wherein the disc guard is configured with a first guard portion and a second guard portion, the first guard portion having a plurality of disc guard mount holes proximate a proximal region of the first guard portion, and a disc guard distal edge at a distal end of the first guard portion, the disc guard distal edge having a substantially curved shape extending from a disc guard anterior point to a disc guard posterior point along the disc guard distal edge,
wherein the disc guard posterior point is located substantially proximate an intersection of the disc guard distal edge and a second line originating from a disc center axis point of the disc at an angle θ° to the posterior of a first line that is substantially plumb originating from the disc center axis point.

10. The disc guard assembly of claim 9, wherein:
the disc guard is plastic; and
the carrier adapter is metal.

11. The disc guard assembly of claim 9,
wherein the second adapter portion includes a first tab having a first tab mount hole, and a second tab having a second tab mount hole, the first tab and the second tab being configured to engage corresponding first and second tab receiving slots with tab receiving mount holes on a first side of the rear brake carrier mount,
wherein the second adapter portion further includes a third tab configured to engage a corresponding third tab receiving slot with third tab receiving mount hole on a second side of the rear brake carrier mount opposite the first side,
wherein the first tab and the second tab are configured to engage corresponding first and second tab receiving slots with tab receiving mount holes on the first side of the rear brake carrier mount, and the third tab is configured to engage the corresponding third tab receiving slot with the third tab receiving mount hole on the second side of the rear brake carrier mount opposite the first side; and
wherein the carrier adapter, when removably attached to the rear brake carrier mount, orients the disc guard so that the first guard portion of the disc guard is in parallel proximity to a face surface of the disc, and the second guard portion of the disc guard is in parallel proximity to a disc perimeter edge thickness of the disc.

12. The disc guard assembly of claim 9, wherein:
the first adapter portion is configured with at least one guard-adapter mount hole; and
the second adapter portion is configured as a cantilever extending away from the first adapter portion to overhang the at least one guard-adapter mount hole.

13. The disc guard assembly of claim 9, wherein
the second guard portion is located along the disc guard distal edge substantially perpendicular to and extending away from an interior surface of the first guard portion along the disc guard distal edge.

14. The disc guard assembly of claim 9, wherein the disc guard is configured with at least one disc guard opening.

15. A carrier adapter for use with a disc guard provided to shield a disc of a rear disc brake system on a motorcycle, the rear disc brake system being configured with a rear brake carrier assembly having a rear brake carrier mount attached to a structural frame of the motorcycle, the carrier adapter comprising:
a carrier adapter body configured to removably attach via a first side to the rear brake carrier mount, the carrier adapter body being configured to removably attach via a second side opposite the first side to the disc guard,
wherein the carrier adapter body includes a plurality of tabs extending upward from the first side, the plurality of tabs being configured to contact respective interior and exterior sides of the rear brake carrier mount, to thereby sandwich and secure the rear brake carrier mount.

16. The carrier adapter of claim 15, wherein the carrier adapter body is metal.

17. The carrier adapter of claim 15,
wherein at least one of the tabs on the first side includes a first hole through which a first fastener is configured to secure the at least one of the tabs to the rear brake carrier mount; and
wherein the second side includes a second hole through which a second fastener is configured to secure the second side to the disc guard.

18. The carrier adapter of claim 15, wherein the first side of the carrier adapter body is laterally offset from the second side of the carrier body.

* * * * *